United States Patent
Steever et al.

(10) Patent No.: US 10,288,734 B2
(45) Date of Patent: May 14, 2019

(54) SENSING SYSTEM AND METHOD

(71) Applicant: Robert Bosch Start-Up Platform North America, LLC, Series 1, Redwood City, CA (US)

(72) Inventors: Audrey Steever, Redwood City, CA (US); Sarah Osentoski, Redwood City, CA (US); Kaijen Hsiao, Redwood City, CA (US); Michael Beebe, Redwood City, CA (US); Jason John Umhoefer, Redwood City, CA (US); Karen Marie Ahle, Redwood City, CA (US); Todd Louis Harris, Redwood City, CA (US); David L. Klein, Redwood City, CA (US); Nick C. Leindecker, Redwood City, CA (US)

(73) Assignee: Robert Bosch Start-Up Platform North America, LLC, Series 1, Redwood City, CA (US)

( * ) Notice: Subject to any disclaimer, the term of this patent is extended or adjusted under 35 U.S.C. 154(b) by 0 days.

(21) Appl. No.: 15/817,486

(22) Filed: Nov. 20, 2017

(65) Prior Publication Data
US 2018/0143320 A1   May 24, 2018

Related U.S. Application Data

(60) Provisional application No. 62/424,308, filed on Nov. 18, 2016.

(51) Int. Cl.
*G01S 17/02* (2006.01)
*G01S 17/93* (2006.01)
*G01S 17/89* (2006.01)
*G01S 17/36* (2006.01)

(52) U.S. Cl.
CPC ............ *G01S 17/026* (2013.01); *G01S 17/36* (2013.01); *G01S 17/89* (2013.01); *G01S 17/936* (2013.01)

(58) Field of Classification Search
CPC ........ G01S 17/026; G01S 17/36; G01S 17/89; G01S 17/42
See application file for complete search history.

(56) References Cited

U.S. PATENT DOCUMENTS

| | | | |
|---|---|---|---|
| 7,940,377 B1 * | 5/2011 | Schmitt | G01J 3/02 356/3.01 |
| 9,489,575 B1 * | 11/2016 | Whalen | G01S 13/94 |
| 9,632,505 B2 | 4/2017 | Hickerson et al. | |
| 9,753,128 B2 | 9/2017 | Schweizer et al. | |
| 2013/0242283 A1 * | 9/2013 | Bailey | G01S 17/89 356/4.01 |
| 2014/0118539 A1 | 5/2014 | Ota et al. | |
| 2015/0341619 A1 * | 11/2015 | Meir | G01S 17/06 348/47 |
| 2016/0040982 A1 * | 2/2016 | Li | G01B 11/026 356/603 |
| 2016/0202846 A1 * | 7/2016 | Ferrand | G06F 3/0481 342/183 |
| 2017/0153319 A1 * | 6/2017 | Villeneuve | G01S 7/4804 |
| 2017/0184704 A1 * | 6/2017 | Yang | G01S 7/4816 |

* cited by examiner

*Primary Examiner* — Eric L Bolda
(74) *Attorney, Agent, or Firm* — Brooks Kushman P.C.

(57) ABSTRACT

A sensing method, including: emitting a signal beam; sampling the reflected signal at a sensor with a field of view larger than the signal beam; and determining a surface parameter based on the bright and dark regions associated with the sampled signal.

20 Claims, 9 Drawing Sheets

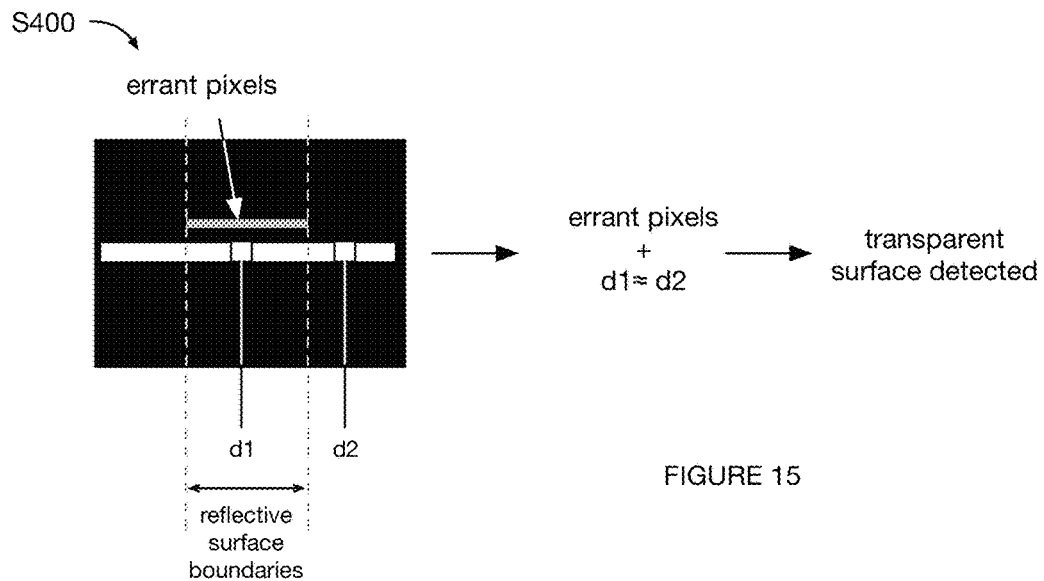
FIGURE 15
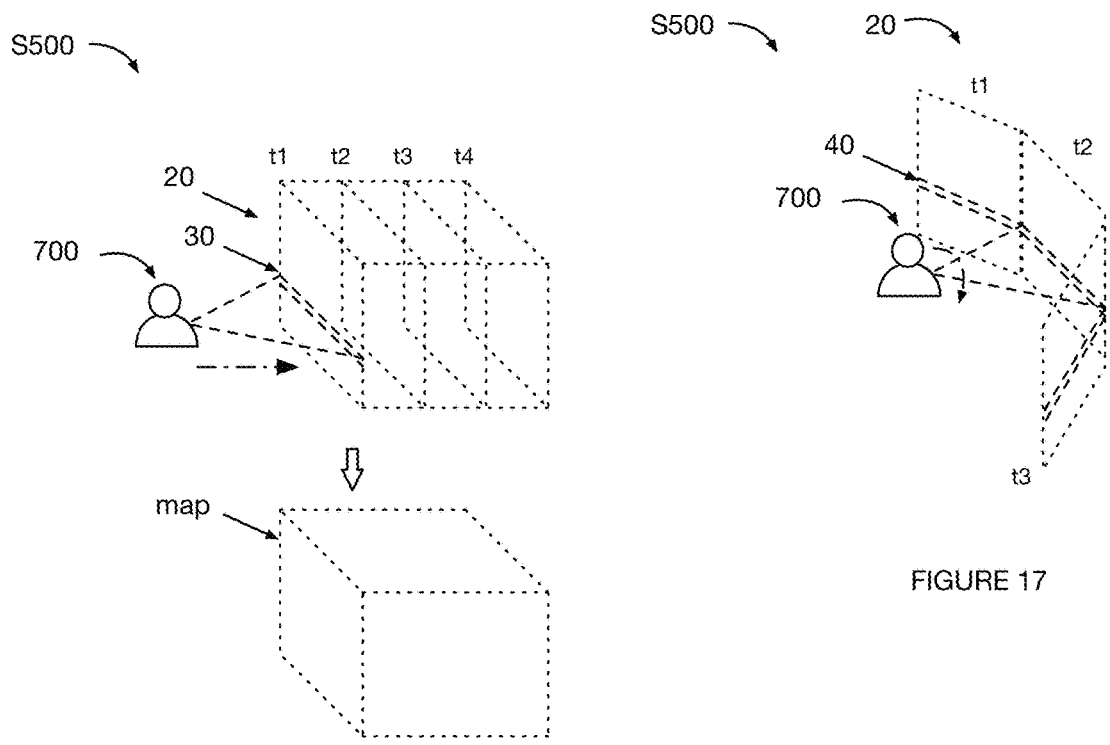
FIGURE 16
FIGURE 17

SENSING SYSTEM AND METHOD

CROSS-REFERENCE TO RELATED APPLICATIONS

This application claims the benefit of U.S. Provisional Application No. 62/424,308 filed 18 Nov. 2016, which is incorporated in its entirety by this reference.

TECHNICAL FIELD

This invention relates generally to the navigation field, and more specifically to a new and useful time-of-flight system and method in the navigation field.

BRIEF DESCRIPTION OF THE FIGURES

FIG. 15 is an example of detecting transparent objects based on errant pixels.

FIG. 16 is an example of sequentially generating a map of a monitored volume.

FIG. 17 is an example of sequentially generating a map of an ambient environment.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 2:
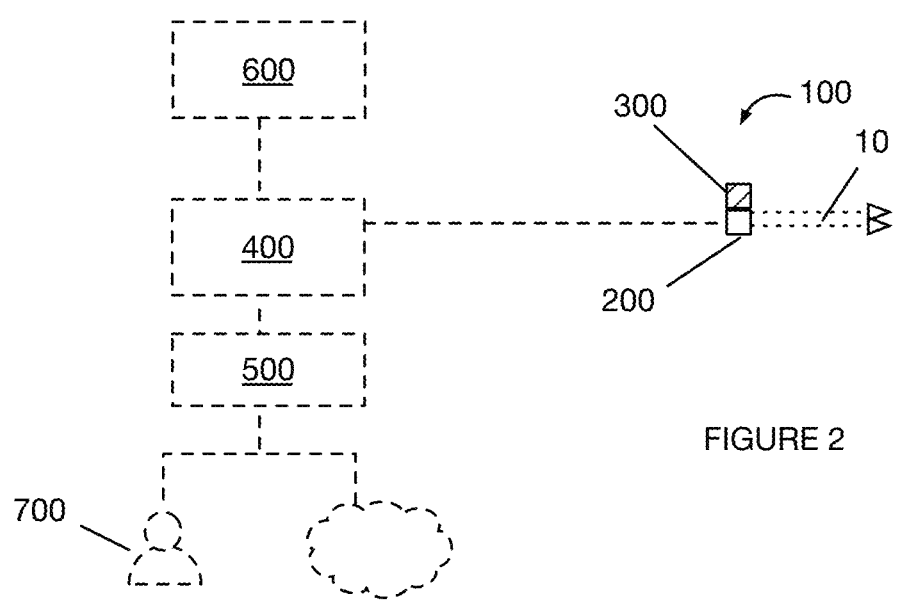
FIG. 2 is a schematic representation of the sensing system emitting a signal beam.

As shown in FIG. 2, the sensing system 100 includes an emitter system 200 and a detection system 300, and can optionally include a processing system 400, a communication system 500, auxiliary sensors 600, a secondary rangefinder, or any other suitable component. As shown in FIG. 2, the sensing system functions to characterize a monitored region 20 of the ambient environment by resolving distances of ambient environment surfaces from the system (e.g., from sampled signals) and/or detect the presence of an object proximate to the system (e.g., within range of the emitted beam 10). In one variation, the sensing system functions as an amplitude-modulated phase-offset time-of-flight system that detects the per-pixel distance of a diffusely reflective surface within the ambient environment.

Figure 3:
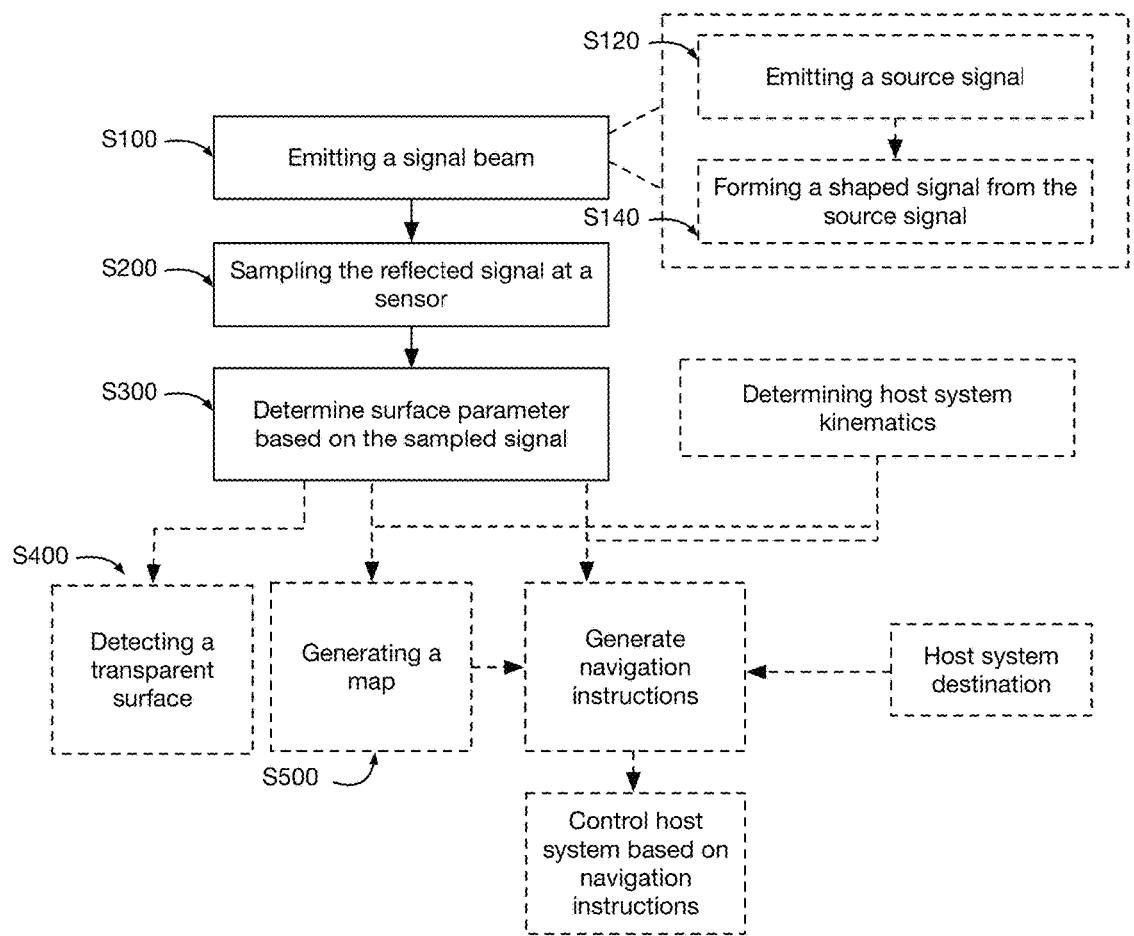
FIG. 3 is a schematic representation of the method of sensing system operation.

As shown in FIG. 3, the sensing method includes: emitting a signal beam S100; sampling the reflected signal at a sensor S200; and determining a surface parameter based on the sampled signal S300. The method functions to characterize the ambient environment. However, the method can enable any other suitable functionality.

In a first variation, the method can include: illuminating an ambient environment with a light beam (e.g., light sheet, cone, etc.), the beam or sheet having a minor dimension; sampling the reflected light beam at a sensor with a field of view larger than the minor dimension; determining pixel parameters for a set of pixels (e.g., bright pixels); determining a range (e.g., external surface range, object range) for each pixel based on the pixel parameters (e.g., based on the phase shift between transmission and receipt); assigning the range to a predetermined angular scene position associated with the respective pixel; and determining ambient environment features based on the range for each angular scene position (e.g., generating a virtual representation of the physical scene, such as a point cloud, and analyzing the virtual representation for scene features associated with objects or voids). This variation can optionally include detecting errant illuminated regions within the expected dark scene, and selectively ignoring the associated pixels or virtual representations, determining transparent object parameters from the errant bright pixels, or otherwise managing the errant illuminated regions. The errant illuminated region can be: illuminated regions (e.g., regions associated with surface parameters determined from the returned signal) within the virtual scene representation that are associated with an expected non-illuminated scene region, regions with errant range readings (e.g., ranges exceeding a threshold range, ranges outside of an expected set of range values, etc.), regions associated with pixels having an angular position associated with an expected non-illuminated scene region, or otherwise determined.

In a second variation, the method can include: illuminating an ambient environment with a light beam or sheet, the beam or sheet having a minor dimension; sampling the reflected light beam at a sensor with a field of view larger than the minor dimension, wherein the sensor is associated with an expected bright region and an expected dark region; determining pixel parameters for bright pixels within the expected bright region; and determining ambient environment features based on the pixel parameters. This variation can optionally include detecting errant bright pixels within the expected dark region, and determining transparent object parameters from the errant bright pixels. This variation can function to characterize the ambient environment, identify and characterize transparent objects in the ambient environment, correct for errors in the sampled signals (e.g., multipath errors), or perform other functionalities.

In a third variation, the method can include: shaping a source light having a predetermined photon budget into a main light beam, illuminating the ambient environment with the main light beam, sampling the reflected main light, and determining ambient environment features for a first region corresponding to the main light beam based on the sampled reflected light. This variant can function to increase the system's irradiance within a monitored region, which can result in a higher signal strength and/or higher SNR.

This variant can optionally include splitting the source light into the main light beam and an auxiliary light beam; illuminating the ambient environment with the main light beam and auxiliary light beam, wherein the auxiliary light beam illuminates a second region of the ambient environment physically separated from the region illuminated by the main light beam; sampling the reflected auxiliary light in addition to the reflected main light, and determining ambient environment features for the second region based on the sampled auxiliary light. This variant can function to monitor multiple regions within the ambient environment.

The sensing system and/or method are preferably used in indoor navigation and/or obstacle avoidance applications, such as consumer robotic navigation or warehouse robotic navigation, but can optionally be used in external navigation and/or obstacle avoidance applications, such as autonomous vehicle navigation, flight control, or other applications.

2. Benefits

Variants of the sensing system can confer several benefits over conventional time-of-flight systems.

First, because the field of view of the imaging system is larger than a dimension of the beam, the expected resultant image encompasses both bright and dark regions, wherein the regions can be scene regions or image regions. These dark regions enable the system to detect and minimize multipathing effects, to detect transparent, reflective objects such as glass, and to perform in-situ (in-field), automatic calibration of the sensing system and/or secondary rangefinder systems.

In a first example, errant light due to multipathing appears as faintly illuminated pixels in an expected dark region (e.g., non-illuminated scene region, image region, sensor region), which can subsequently be identified and compensated for when determining the object distance from the system.

Figure 13:
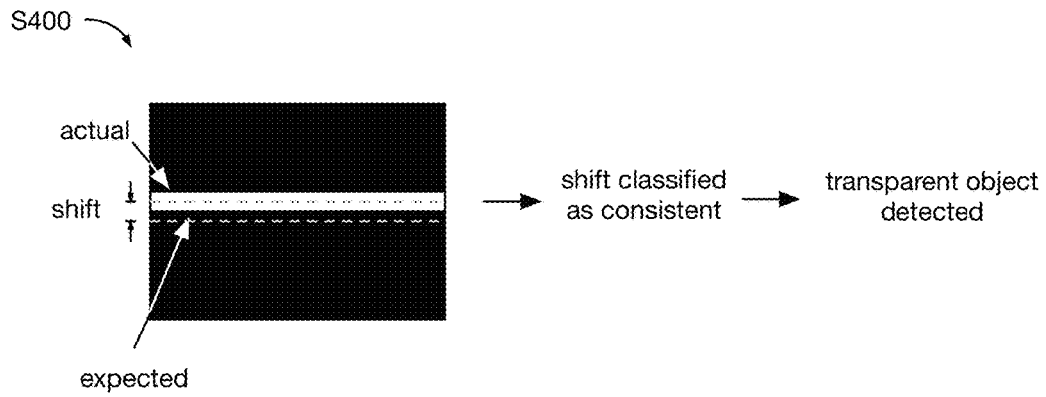
FIG. 13 is an example of determining external surface parameters based on pixel signals.

In a second example (shown in FIG. 13), transparent objects can be identified in response to detection of bright pixel shift relative to an expected bright pixel band or in response to detection of a group of bright pixels in an expected dark pixel region (e.g., for a beam emitted at an angle to an emitter normal vector).

In a third example, the object distance as determined by a secondary rangefinder (e.g., triangulation system or LIDAR) can be used to calibrate the sensing system. This can function to calibrate the sensing system for multipath effects or other effects.

In a fourth example, the object distance as determined by the sensing system can be used to calibrate the secondary rangefinder (e.g., triangulation system, such as RP-LIDAR).

In a fifth example, the sensing system can be corrected or disambiguated based on the position of the bright-dark pixel border in parallax shift.

However, the large image sensor field of view relative to the emitted beam can confer any other suitable set of benefits.

Second, the system can increase the strength of the measured signal and/or increase the signal to noise ratio (SNR) by concentrating the emitted light into a narrow beam or sheet. This can further increase detection sensitivity and/or resolution. Conventionally, the total amount of energy that can be emitted is regulatorily limited, which limits the amount of light output at the emitter surface, particularly for wavelengths that can be absorbed by the eye (e.g., between 310 nm to 1,000 nm). In conventional time-of-flight systems, this photon budget must be spread across the entire scene, leading to low irradiance and a lower overall signal (and/or lower SNR). Here, the inventors have discovered that for navigation and obstacle avoidance purposes, knowledge of a cross section of the scene is sufficient (e.g., a scene section intersecting a system traversal path); in other words, the entire scene does not have to be illuminated. By shaping the previously disperse light into a narrow beam or sheet, the inventors are able to use the same photon budget (e.g., the same amount of emitted photons) concentrated in a smaller band. This increased photon budget concentration can result in higher irradiance, higher signal strength, and/or higher SNR. Additionally, or alternatively, this increased photon budget can decrease the light emission duration, which can enable higher light intensities to be used.

Third, the imaging system can include optics that are more suitable for collecting the returned signal than traditional imaging optics. Conventionally, time-of-flight systems that employ light as a signal use radially symmetric imaging optics. With a shaped illumination, the optics need not capture the entire field; this allows the regions of interest to be spread across the sensor more evenly and completely, increasing SNR, decreasing saturation risk, and reducing or eliminating poor or uneven signal returns due to lens vignetting.

However, variants of the sensing system and method can confer any other suitable set of benefits over conventional systems.

3. Sensing System.

Figure 12:
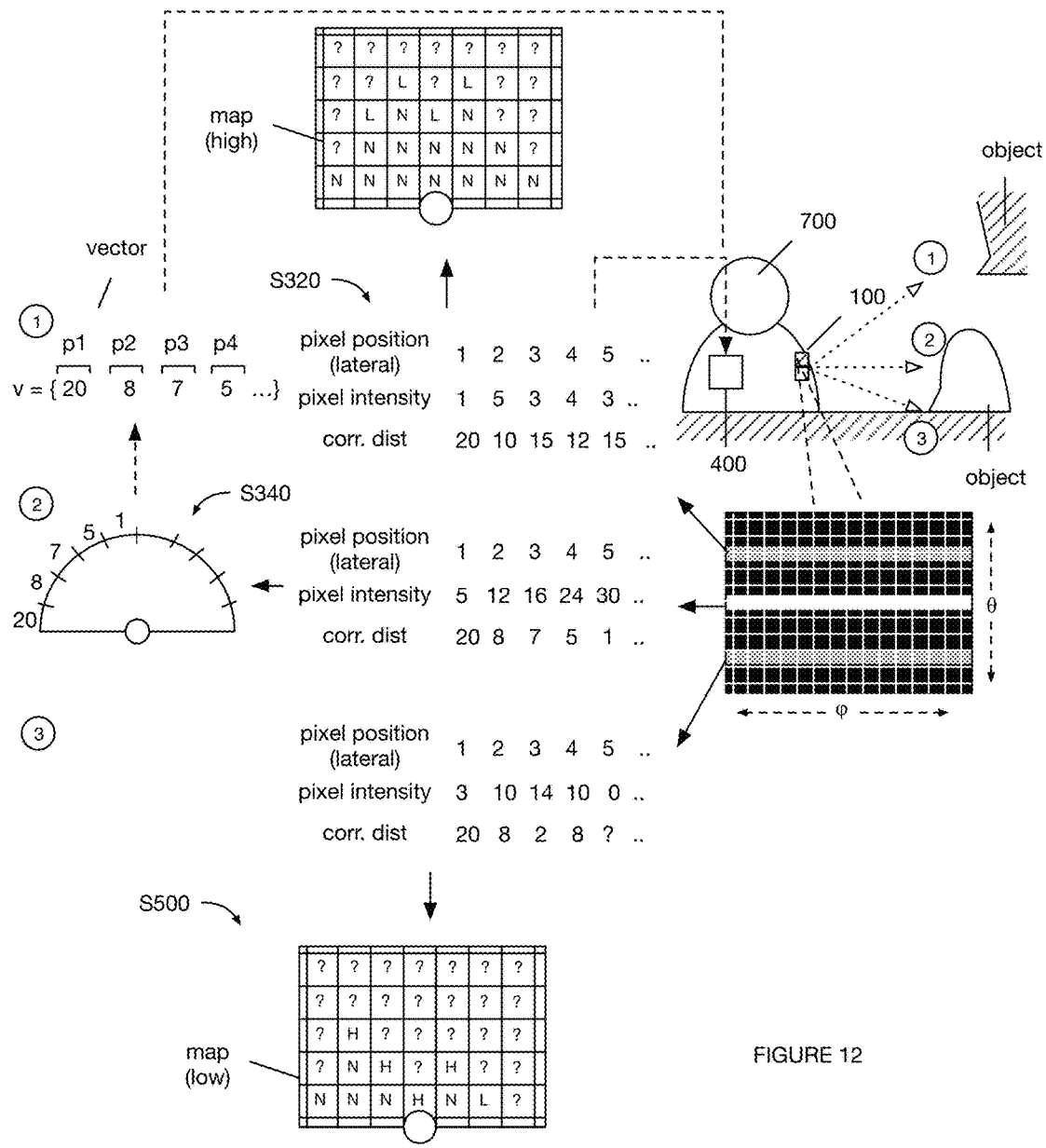
FIG. 12 is a specific example of the sensing system in use.

The sensing system is preferably mounted to a host system 700, such as a robot or vehicle (example shown in FIG. 12), but can be incorporated into any other suitable system or used as an independent module. The sensing system preferably performs all or parts of the method discussed below, but can additionally or alternatively perform any other suitable function. In variations, the sensing system can operate as a modulated time-of-flight system (e.g., including modulated light sources with phase detectors), a range gated imager, a direct TOF imager, or any other suitable ranging system.

The sensing system can provide data (e.g., ambient environment parameters, obstacle parameters, etc.) to the host system for use in route planning, object identification, object tracking, environment mapping, environment monitoring, or any other suitable application. The sensing system output is preferably fed to the host system processing system, which determines host system location based on the sensing system output using SLAM, particle filters, or other localization methods. The host system location can be used for navigation using RRTs, grid-based planning, kinematics, or other navigation methods, but can be otherwise used. The host system can additionally or alternatively use sensing system outputs to build maps of the volume (e.g., as the host system traverses through the volume) or use the outputs in any other suitable manner. The sensing system can additionally or alternatively use outputs from the host system components, such as outputs from the auxiliary sensors or drivetrain and/or share components with the host system, such as the processing system or auxiliary sensors. In one example, the sensing system can use the host system pitch, as determined from the host system IMU, to determine the angle of the floor for floor terrain mapping (e.g., for point cloud transform generation, point cloud plane fitting). In a second example, the sensing system can user the host system kinematics to determine or validate the sensing system's location within the physical space. However, the sensing system can be separate from or otherwise incorporated into the host system.

Figure 5:
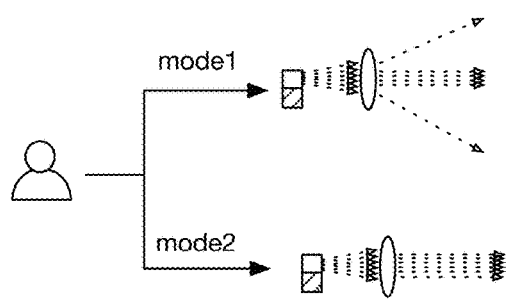
FIG. 5 is a schematic representation of the sensing system operating between a first and second mode.

The system operation parameters (e.g., emission and/or sampling rate, emission intensity, sensor sensitivity, etc.) can be predetermined, vary as a function of host system kinematics (e.g., increase with increased acceleration and/or velocity), vary based on the output's use or application (e.g., wherein the host system or other control system selects a sensing system operation mode), or otherwise determined. For example, all or most of the emitted signal can be used to form a single beam for mapping purposes (e.g., to increase signal strength and minimize noise), while the emitted signal can be split into multiple beams for obstacle detection and navigation purposes (e.g., to increase the size of the monitored region); examples shown in FIG. 5. However, the system can be otherwise controlled.

The host system is preferably mobile and capable of traversing through a physical space (e.g., the ambient environment), but can alternatively be static. The host system mobility can be limited (e.g., be terrestrial and limited to movement in two axes), be unlimited (e.g., capable of moving along all axes and rotations), or be capable of any suitable motion. Examples of host systems include robots, terrestrial vehicles, aerial vehicles, aquatic vehicles, security systems, or any other suitable host system. In a specific example, the sensing system can be mounted to and used as a safety curtain for industrial robots (e.g., as a sensing system located on an industrial robot arm). However, the sensing system can be otherwise used.

The host system can include: a processing system configured to control host system operation, a communications system configured to send and receive data (e.g., short-range, such as BLE or NFC; long-range, such as WiFi or cellular; or wired, such as USB or Ethernet; etc.), a drivetrain configured to move the host system within a physical volume, auxiliary sensors configured to augment or supplement host system navigation (e.g., orientation sensors such as accelerometers, gyroscopes, IMUs, magnetometers; optical sensors such as cameras; motor encoders; acoustic sensors such as microphones; range-finding transducers, such as triangulation systems; additional emitter-detection systems; etc.), or any other suitable component.

The sensing system is preferably configured to illuminate a medial scene segment (e.g., portion of the scene substantially aligned with or proximal a host system midline), can alternatively or additionally illuminate a superior or inferior scene segment (e.g., portion of the scene substantially aligned with or proximal a host system top or bottom, respectively), a right or left scene segment, or any other suitable scene segment. The illuminated scene segment 30 is preferably along the direction of host travel, but can be otherwise arranged. The illuminated scene segment can be aligned perpendicular a limited motion axis, but can be aligned parallel the limited motion axis or otherwise arranged. For example, the illuminated scene segment can be a horizontal segment when the host system is a terrestrial system (e.g., limited to motion in the x-y plane). However, the illuminated scene segment can be otherwise configured.

The sensing system is preferably mounted to a medial section of the host system (e.g., proximal a midline or geometric center of the host system), but can alternatively be mounted to a superior portion, inferior portion, a right or left side, or any other suitable portion of the host section. The sensing system is preferably mounted such that the beam is emitted at an angle (e.g., 0°, 45°, 90°, etc.) relative to a reference plane, wherein the reference plane can be a host system transverse plane, sagittal plane, or coronal plane, a ground plane, a ceiling plane, or any other suitable plane. The angle can be predetermined (e.g., based on the host system dimensions, such as height and width), dynamically adjusted (e.g., based on host system pitch, yaw, roll, height, etc.), or otherwise determined. Additionally, or alternatively, the sensing system is mounted such that an active surface of the detection system is substantially parallel the illuminated scene segment. However, the sensing system can be mounted in any other suitable configuration.

Each host system can include one or more sensing systems, wherein multiple sensing systems are preferably mounted to the host system such that the scenes (regions) monitored by each sensing system does not overlap. However, the multiple sensing systems can be mounted such that the monitored regions overlap, or be otherwise mounted.

Figure 1:
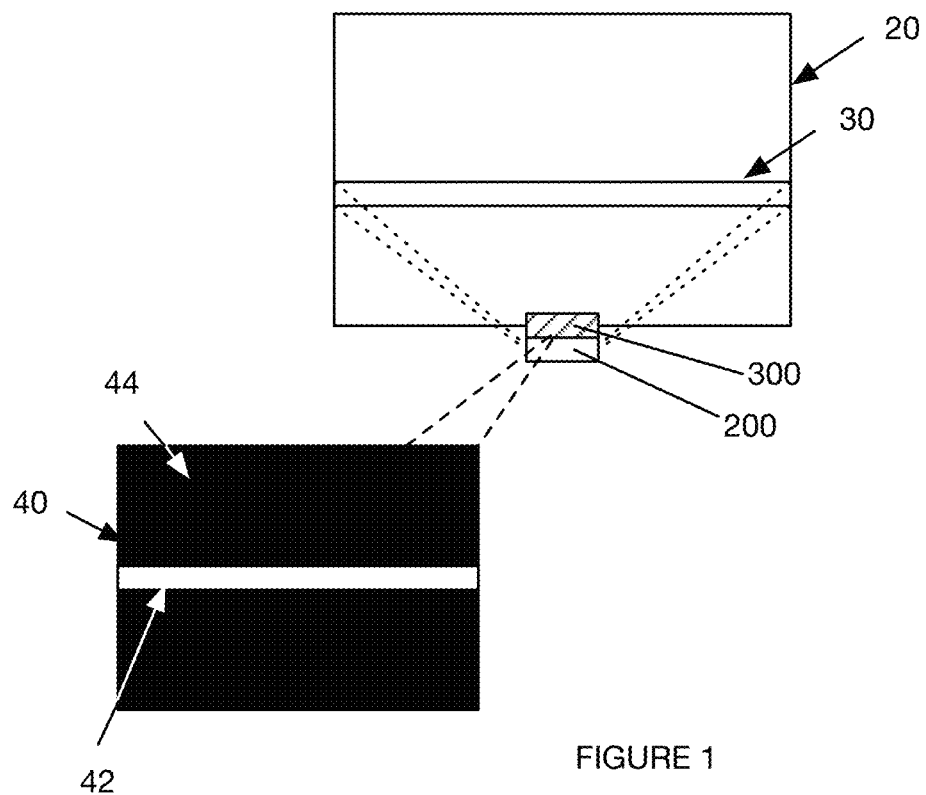
FIG. 1 is a schematic representation of a variation of the sensing system in operation.

As shown in FIG. 1, the sensing system 100 can include an emitter system 200 and a detector system 300.

a. Emitter System.

As shown in FIG. 1, the emitter system 200 of the sensing system 100 functions to emit a signal beam 10, which strikes a scene. The emitter system is preferably controlled by the control system (e.g., processing system) and powered by an on-board power supply of the sensing system or host system (e.g., rechargeable battery, solar system, thermionic system, etc.), but can be otherwise controlled or powered.

The beam 10 (and/or underlying signal) is preferably light, but can alternatively be electromagnetic signals (e.g., radio waves), acoustic signals, or be any other suitable signal. The signal is preferably emitted from the emitter system as a beam or sheet (sheet of light, light sheet), but can additionally or alternatively be divergent, disperse, structured, patterned, or have any other suitable form factor or geometry. The beam emitted by the emitter system is preferably characterized by a set of beam parameters, which can include beam cross-section (e.g., perpendicular the emission vector, parallel the emission vector, etc.), beam dimension, beam intensity, beam divergence, beam shape, beam quality, beam astigmatism, beam jitter, light wavelength(s), light phase, beam orientation, or any other suitable parameter.

The beam can have a single wavelength or a range of wavelengths. In one variation, the light forming the beam is preferably IR light, more preferably near-IR light (e.g., between 700 nm to 3,000 nm) but alternatively mid-infrared (between 3,000 nm to 50,000 nm) or far-infrared (50μ-1,000μ); but can alternatively be visible light, UV light, or have any other suitable wavelength (or range thereof) within the electromagnetic spectrum. In one embodiment, the beam has a wavelength of 850 nm. The beam wavelengths emitted by the emitter system can remain constant over time (e.g., be a predetermined wavelength set), vary over time (e.g., vary between sequential pulses), or be otherwise determined. The beam intensity emitted by the emitter system (e.g., post-shaping), is preferably lower than or substantially equal to the regulatory limits, but can alternatively be higher.

The beam emitted by the emitter system is preferably amplitude-modulated, but can be otherwise modulated (e.g., phase modulated, frequency modulated, polarization modulated), unmodulated, or have any other suitable structure. The beam can be directly modulated (e.g., by modulating the current driving the light source, such as with an RF modulator), externally modulated (e.g., by a light modulator, a diffractive or refractive film at the light exit), or otherwise modulated by an optical modulator. The modulator can be an absorptive modulator, refractive modulator (e.g., electro-optic modulator, acousto-optic modulator, etc.), a refractive modulator connected to an interferometer or directional coupler, or any other suitable modulator. In one variation, the signal emitted by the emitters (e.g., source signal, source light) can be modulated (e.g., at a frequency between 1 kHz-100 kHz or any other suitable frequency), wherein the beam is formed from the modulated raw signal. In a second variation, the signal emitted by the emitters can be unmodulated, wherein the signal shaper modulates the signal during beam shaping. Alternatively, the beam can be modulated by a light modulator after shaping. However, the beam can be otherwise modulated or adjusted.

The emitter system can emit beams with one or more modulation frequencies, wherein different frequencies can be used to validate or refine the object detection output. For example, beams with a second frequency can be used to heterodyne longer ranges (e.g., with higher confidence and/or resolution), and beams with a third frequency can be used to aid disambiguation. However, the different frequencies can be used in any other suitable manner. Beams with different frequencies are preferably emitted and sampled asynchronously (e.g., serially, according to a schedule, etc.), but can alternatively or additionally be emitted and/or sampled concurrently.

The beam is preferably oriented parallel to the normal vector of detecting sensor active surface, but can additionally or alternatively be oriented perpendicular to a vertical axis of the host system, perpendicular to a gravity vector (e.g., wherein the emitter or sensing system can be mounted on a gimbal or other rotational system, statically mounted to the host system, etc.), parallel to a host system support surface, or be oriented at any other suitable angle.

The beam can be divergent, diffused, substantially collimated (e.g., with little or no divergence), or have any other suitable divergence or parameter value.

Figure 8:
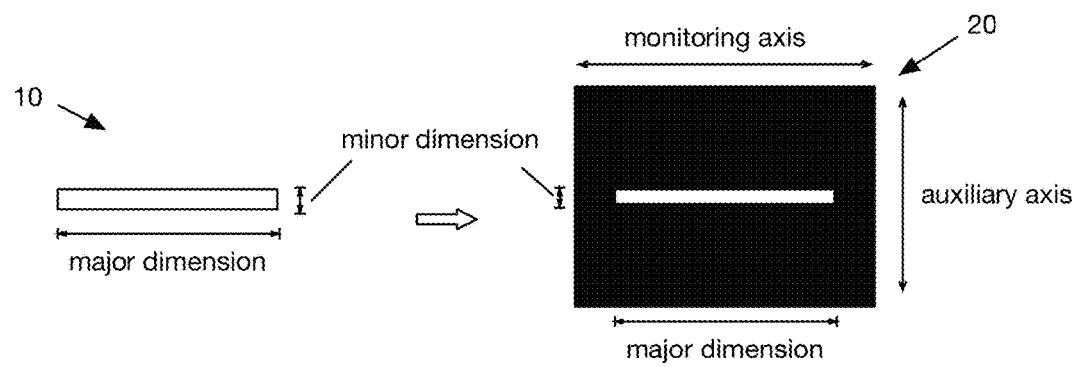
FIG. 8 is an example of the beam and the corresponding expected bright and dark pixel regions.

As shown in FIG. 1, the beam is preferably a sheet with an elliptical, rectangular, or other cross section, but can optionally have a circular cross section or any other suitable cross section. The beam cross section can have a major dimension (e.g., extending along a main axis or monitoring axis of the scene) and a minor dimension (e.g., extending along a minor axis or auxiliary axis of the scene), example shown in FIG. 8, or have any suitable set of dimensions. One or more beam dimensions (e.g., beam width, beam height, beam diameter, etc.) is preferably smaller than the imaging sensor's (and/or resultant image's) field of view (FOV) or active area (e.g., less than 10%, 20%, 50%, or any other suitable proportion of the FOV or active area), but the beam can alternatively have one or more dimensions equal to or larger than any other suitable set of FOV dimensions. In one example, the minor dimension is smaller than the corresponding dimension (e.g., parallel dimension) of the imaging sensor or image FOV. In a specific example, the minor dimension can be the beam height, wherein the imaging sensor FOV (and resultant image's FOV) height is larger than the beam (e.g., extends above and/or below the beam). In this example, the major dimension can be smaller than, equal to, or larger than the corresponding dimension of the imaging sensor FOV. However, the beam dimensions can be otherwise related to the imaging sensor and/or image FOV.

In variants where the beam has a non-circular cross section, the beam is preferably oriented with the main axis extending horizontally (e.g., substantially perpendicular to the host system vertical axis or gravity vector; substantially parallel to the support surface, etc.), but can alternatively be oriented with the main axis extending vertically or at any other suitable angle. In these variants, the beam diameter along the minor axis is preferably smaller than the field of view of the imaging sensor in the corresponding dimension (e.g., the beam height is smaller than the FOV height), while the beam diameter along the major axis can be less than, equal to, or larger than the field of view of the imaging sensor in the corresponding dimension (e.g., the beam width is larger than the FOV width). In these variants, the beam diameter and/or diameter resulting from divergence along the major axis is preferably larger than the host system in the corresponding dimension (e.g., wider than the robot width), but can be smaller than, equal to, or otherwise dimensioned relative to the host system dimensions.

The emitter system 200 can include an emitter 220 (e.g., an illumination unit), signal shaper 240 (e.g., emitter optics), and/or any other suitable set of components. The sensing system preferably includes a single emitter system, but can alternatively include multiple emitter systems. In the latter instance, the emitter systems preferably illuminate separate and distinct (e.g., non-overlapping) physical regions, but can alternatively illuminate the same physical region (e.g., wherein the emitted signal can be directed toward the same physical region, be shaped into a common beam, etc.). The emitter system and components thereof are preferably statically mounted to the sensing system (e.g., sensing system housing, host system housing) and/or detection system (e.g., by the sensing system housing), but can alternatively be actuatable (e.g., mounted to a motor or other positioning system) or otherwise mounted.

The emitter 220 of the emitter system 200 functions to emit the signal that subsequently forms the beam. The signal is preferably light, but can alternatively be electromagnetic signals (e.g., radio waves), acoustic signals, or be any other suitable signal. The signal can have the same parameters as the beam (e.g., dimensions, intensity, divergence, modulation frequency, etc.) or have different parameters from the beam. The signal emitted by the emitter preferably has the beam wavelength, but can alternatively have any other suitable wavelength. The signal can be pulsed light, a continuous wave, a quasi-continuous wave, or otherwise structured. However, any other suitable signal can be emitted. The emitter system can be a point source, line source, or any other suitable source.

The signal intensity emitted by each individual emitter and/or emitter set (e.g., source light, pre-shaping) is preferably lower than or substantially equal to the limit prescribed by regulatory standards (e.g., according to IEC-62471, IEC-60825, or any other suitable standard), such that the optical detection system has a limited photon budget, but the signal intensity can alternatively be higher. The signal can be emitted with an optical power output equal to, less than, or greater than: 10 mW, 500 mW, 2 W, any power output therebetween (e.g., 40-100 mW), or any other suitable power output limit. In a specific example, the emitter can be a 2 W VCSEL array The emitter can be constantly on, pulsed at a predetermined frequency, or otherwise operated. However, the signal can be emitted at power levels above the regulatory emission limit, or at any other suitable power level.

The emitter system can include one or more emitters, wherein multiple emitters can be arranged in an array or otherwise arranged. The emitters can include one or more signal-emitting elements, such as illumination units (light-emitting elements, luminaries,), radios (e.g., Bluetooth, WiFi, other electromagnetic wave-emitting element, etc.), acoustic units (e.g., speakers), or any other suitable signal-emitting element. The illumination unit can be a laser, LED, OLED, incandescent light, or any other suitable light-emitting element. The emitter can be an IEC-60825 Class 1, 1M, 2, 2M, 3, 3B, or 4 emitter, be any other suitable regulatory-compliant emitter, or be any other suitable emitter. Alternatively, the emitter can emit light at any suitable emission level, which can be statically set or dynamically change (e.g., based on operating context, such as whether a user is proximal the system).

The signal shaper 240 of the emitter system 200 functions to form the beam. The signal shaper can optionally change the emitted signal parameters. The signal shaper is preferably statically mounted relative to the emitter (e.g., a predetermined distance away from the emitter), but can alternatively be actuatably mounted or otherwise mounted. The emitter system can include zero, one, or multiple signal shapers. Each emitter can be paired with one or more signal shapers. However, the emitters and signal shapers can be otherwise configured.

In a first variation as shown in FIG. 2, the emitter optics can include focusing optics, which function to focus the light into a beam having the desired parameters. Focusing optics that can be used can include: apertures, lenses (e.g., optical collimating lens, etc.), mirrors (e.g., an optical cavity with parallel mirrors; concave mirrors, flat mirrors, parabolic mirrors, spherical mirrors, etc.), freeform molded optics, or any other suitable focusing system.

In a second variation, the emitter optics can include a beam shaper 242, which functions to shape the light incident on the scene. Beam shapers that can be used include: apertures, field mappers, beam integrators, lenses, mirrors, diffusers, diffractive elements, prisms, or any other suitable beam shaping system. The beam shaper can be made of glass (e.g., transparent material), specular reflective material (e.g., mirrored surfaces), or any other suitable material. However, any other suitable beam shaper can be used.

In a third variation, the emitter optics can include splitting optics, which functions to split the light into multiple beams. In a first embodiment, the splitting optics can focus or shape light from multiple emitters into a predetermined number of beams. In a second embodiment, the splitting optics can split a single beam into multiple beams. However, the splitting optics can function in any other suitable manner. When the splitting optics is used with other emitter optics, the splitting optics can be arranged between the emitter and the focusing optics, arranged distal the emitter downstream from the focusing optics, or be arranged in any other suitable position. However, the same system can function as both splitting optics and focusing optics, or perform any other suitable functionality. The splitting optics can include: multiple apertures, prisms, mirrors (e.g., angled mirrors), diffractive elements, freeform optics, engineered diffuser surfaces, or any other optics capable of creating multiple beams.

The resultant beams are preferably separated from each other (e.g., on the incident scene) by an emission angle, but can alternatively be contiguous or otherwise arranged. The resultant beams are preferably separated from each other by a separation angle (e.g., at emission), but can alternatively be separated by a separation distance or otherwise related. For example, the resultant beams can be 10° apart, 30° apart, 45° apart, or separated by any other suitable separation angle. In a specific example, a downward-facing beam is directed at a downward angle of 31°. The separation angle can be predetermined (e.g., based on the height of the primary system, the sensing system placement on the primary system, the number of beams, the total monitored scene region, etc.), dynamically determined (e.g., based on the location of an identified scanning region relative to the sensing system mounting point, etc.), or otherwise determined. The separation angles can be equal or different. The separation angle is preferably defined along the beam minor axis (e.g., scene auxiliary axis), but can alternatively be defined along the beam major axis (e.g., scene monitoring axis) or along any other suitable axis. The separation angle can be an altitude, an azimuth, or be any other suitable angle extending along any other suitable plane. The separation angle can be measured from the beam major axis, beam minor axis, or relative to any other suitable portion of the beam. The resultant beams are preferably at a predetermined emission angle relative to each other, but can alternatively or additionally be parallel to each other, illuminate parallel scene segments, be perpendicular (or at any suitable angle, such as 30°, 60°), or arranged in any other suitable relative orientation.

The resultant beams can have the same intensity (e.g., same irradiance, same number of photons, etc.) or different intensities. For example, the emitter optics can split the source signal (e.g., source light) into a first beam with 10% of the photon budget and a second beam with 90% of the photon budget. The relative intensities between the beams can be predetermined, dynamically determined (e.g., based on obstacles detected in prior samples, ambient light in each monitored scene segment, etc.), or otherwise determined.

In one example, the splitting optics split the emitted beam into a main beam with 80% of the light, and two auxiliary beams, each with 10% of the light and separated from the main beam by a first and second predetermined angle, respectively (e.g., 30° and 20°, respectively; both 30°; etc.). The main beam and auxiliary beams are preferably separated vertically (e.g., perpendicular to the main beam major axis), such that the uppermost auxiliary beam (high beam, clothesline beam) is directed upwards and the lowermost auxiliary beam (low beam, floor beam) is directed downwards, but can be otherwise aligned. In a specific example, the low beam intersects a plane perpendicular to the primary system vertical plane and/or parallel to the primary surface support surface (floor plane or cliff plane) within a predetermined distance of the emitter system or primary system housing (e.g., within 1 inch, 6 inches, 1 foot, etc.), while the high beam intersects a top plane ("clothesline" plane), parallel to the floor plane, intersecting the primary system top, or otherwise defined, within a second predetermined distance of the emitter system or primary system housing (e.g., within 1 inch, 6 inches, 1 foot, etc.). However, the beams can be otherwise oriented.

b. Detection System.

The detection system 300 of the sensing system 100 functions to sample signals emitted by the emitter system and returned (e.g., reflected) by surfaces in the environment surrounding the sensing system. The detection system can sample a representation of the returned signal 40, which can be an image or any other suitable representation. The detection system is preferably controlled by the control system and powered by the same power supply as the emitter system, but can be otherwise controlled and/or powered.

The sensing system can include one or more detection systems. In one variation, the sensing system includes a single detection system for all beams emitted by the emitter system(s). In a second variation, the sensing system includes a detection system for each beam. In a third variation, the sensing system includes multiple detection systems for a beam. However, the sensing system can include any suitable number of detection systems. The detection system is preferably arranged proximate to the respective beams' emitter system (e.g., above, below, to the side, etc.; coplanar, recessed, proud, etc.), but can be otherwise arranged (e.g., wherein the recorded image is reflected or otherwise redirected to the detection system). The detection system is preferably arranged along the minor axis of the beam relative to the emitter system, but can be otherwise arranged.

The detection system is preferably statically coupled to the emitter system, but can be actuatably coupled or otherwise coupled to the emitter system. The detection system is preferably arranged such that the detector active face is parallel to and codirectional with the emitter active face, but can be arranged at a non-zero angle to the emitter active face or otherwise arranged.

The detection system preferably outputs signal representations (e.g., images) of the scene illuminated by the signal (illuminated scene), but can alternatively or additionally generate a set of pixel signals indicative of signal reflections off the scene surfaces, or sample any other suitable set of data. The images can be visual images, acoustic images (e.g., spatial representation of sound), electromagnetic images, or any other suitable image. The detection system is preferably configured to cover (e.g., monitor, capture, sample) a broader region of the scene than the beam emitted by the emitter system, but can alternatively cover the same region, a region of similar size, a smaller region, or any other suitable region relative to the region covered by the emitter system (e.g., region illuminated by the emitter system). In one variation, detection system preferably has a detection area or field of view (FOV) larger than a dimension of the signal beam, but can additionally or alternatively have a FOV larger than a dimension of the segment of the scene illuminated by the emitter system (illuminated scene), or have any other suitable FOV. The resultant image preferably has a FOV (e.g., scene portion that the image represents or captures) with one or more dimensions larger than the beam, but can alternatively have a FOV with any other suitable set of dimensions. The resultant image can have the same FOV as the sensor, be cropped, or be otherwise related to the sensor FOV.

The detection system is preferably configured such that the expected resultant image includes both bright pixels 42, corresponding to signals reflected by the illuminated scene and received at the detector sensor, and dark pixels 44, corresponding to the non-illuminated regions of the environment. In this variation, the image and/or sensor can be associated with an expected bright region (including a set of expected bright pixels or expected illuminated scene regions) for each beam that corresponds to the respective illuminated scene (and/or sensor region expected to receive the respective beam reflection), and expected dark region(s) (including set(s) of expected dark pixels) that correspond to the non-illuminated scene (and/or sensor region(s) expected to receive little to no beam reflections).

The expected bright region is preferably associated with a predetermined pattern, predetermined virtual region within the virtual scene representation, predetermined set of positions relative to a host system (e.g., based on system pose relative to the host system; illuminated regions in global coordinates; etc.), or any other suitable parameter. The predetermined pattern is preferably dependent upon the beam parameters (e.g., preferably substantially similar to the beam parameters or be a scaled version thereof), but can be otherwise determined. For example, a band can be expected in the resultant image when the light beam is formed into a sheet, while a diffuse pattern can be expected when the beam path includes a diffuser.

In a first specific example wherein the emitter system emits a horizontal light sheet and the detection system samples a region taller than the illuminated scene section, the image can be associated with an expected bright band, corresponding to the illuminated scene section and an upper and lower expected dark band corresponding to non-illuminated scene sections. In a second specific example, wherein the emitter system emits an upper, middle, and lower horizontal light sheet and the detection system samples a region taller than the monitored region extending between the upper and lower illuminated scenes, the image can be associated with an upper, middle, and lower expected bright band corresponding to the upper, middle, and lower illuminated scene sections, and intervening dark bands corresponding to non-illuminated scene sections. The bright bands can include non-contiguous or contiguous bright pixels, wherein the bright pixel arrangement, density, or other parameters can be determined based on the band pair separation distance, emission angle, emission intensity, or otherwise determined.

However, the reflected signal can be otherwise represented in the image. However, the detection system can be otherwise dimensioned and the resultant image can include any other suitable distribution of bright and dark pixels. However, the detection system can be otherwise configured.

The detection system 300 can include one or more detector sensors 320, signal collectors 340, or any other suitable component.

The detector sensor 320 of the detection system 300 functions to sample the reflected beam (e.g., signals of the beam reflected off surfaces of the ambient environment). The detector sensor can sample the beam intensity or amplitude, phase, angle of arrival, or any suitable signal parameter. The detector sensor is preferably an image sensor, but can alternatively or additionally be an optical sensor, an acoustic sensor, electromagnetic sensor (e.g., radio), or be any other suitable sensor. The detector sensor is preferably sensitive in the sensor wavelengths (e.g., be an IR sensor), but can alternatively be sensitive to a wider or narrower range of wavelengths. The image sensor can include one or more CCD sensors, CMOS sensors, photodetector arrays, or any other suitable imaging system. The image sensor can optionally include a shutter (e.g., operate similar to a range gated imager), optical gate, or any other suitable component. Alternatively, or additionally, the detector sensor can be an optical receiver (e.g., IR receiver), phase detector, or be any other suitable sensor. The detector sensor can be a one, two, or multiple directional sensor. The detector sensor sensitivity is preferably predetermined and static, but can alternatively be dynamically adjusted (e.g., based on ambient light or noise, operating context, power source SOC, detected or anticipated external obstacles, etc.) or otherwise determined. The sample (e.g., image) sampled by the detector sensor can have a crop factor of 1, less than 1, more than 1, or be otherwise related to the sensor active area.

Figure 10:
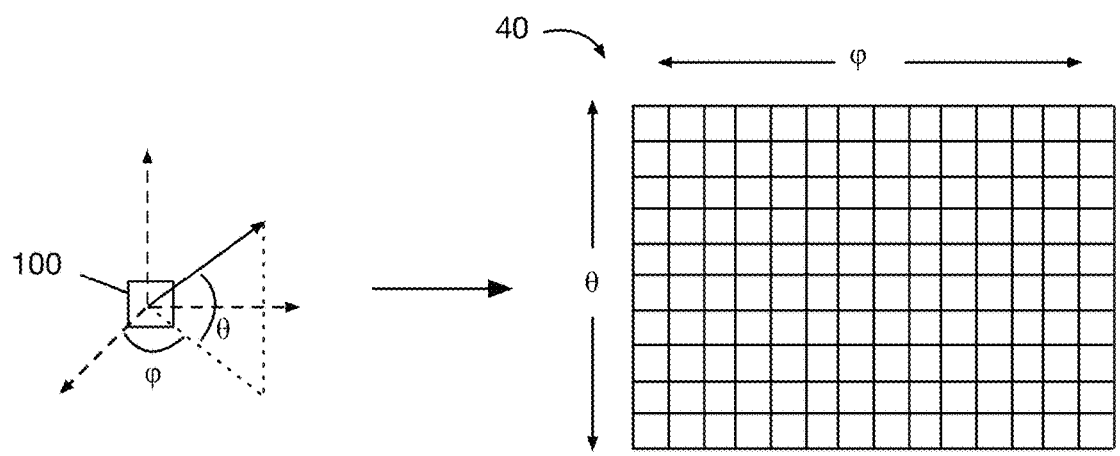
FIG. 10 is a variation of a map associating pixel indices with azimuthal and/or polar angles.
Figure 11:
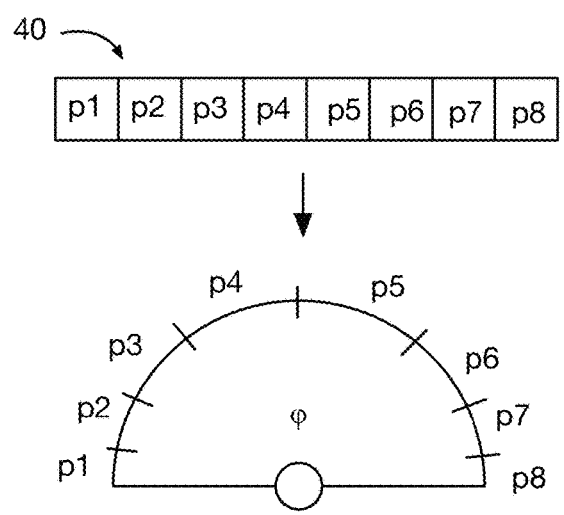
FIG. 11 is an example of a pixel-to-azimuthal angle map.

The detector sensor preferably includes an array of sensing elements (e.g., pixels), but can be otherwise configured. The pixels of the detector sensor and/or resultant image are preferably individually indexed, but can be otherwise identified. The pixel position within the detector sensor is preferably associated with a physical position in the monitored scene. In one variation, different pixel sets arranged along a sensor axis can be assigned to different angular positions relative to the sensing system (e.g., within a plane shared by the axis and the sensing system). In one embodiment, each pixel is assigned (e.g., mapped) to a predetermined azimuthal angle and/or polar angle relative to the sensing system (examples shown in FIG. 10 and FIG. 11), which can be converted to a host system coordinate system based on a predetermined mapping between the sensing system and host system (e.g., based on the sensing system's mounting location and angle relative to a host system reference point) and/or global coordinate system based on the host system global location and pose (e.g., determined from host system location sensors, range-finding systems, pose sensors, etc.). For example, each pixel within a horizontal expected bright band (e.g., extending along a monitoring axis) can be associated with a different horizontal angular position (azimuthal angle; φ) relative to the sensing system (e.g., increasing from −90° to 90° going from leftmost pixels to rightmost pixels along the monitoring axis). In another example, each pixel along a vertical axis is associated with a different altitude or vertical angular position (polar angle; θ) relative to the sensing system. The physical position associated with each pixel is preferably predetermined (e.g., through calibration), but can alternatively be dynamically determined (e.g., through real-time calibration using a second range-finding system, IMU output, consistent bright band shift, etc.) or otherwise determined. However, the pixels can be otherwise identified and/or correlated to the physical monitored scene.

Figure 6:
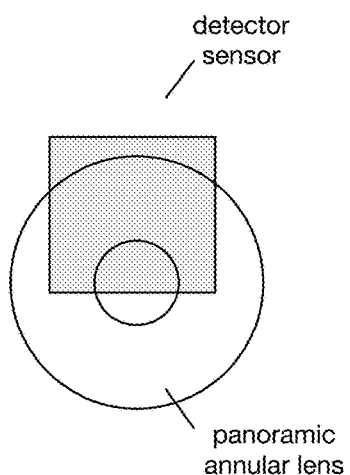
FIG. 6 is a specific example of an imaging optics-detector sensor arrangement

The signal collector 340 of the detection system 300 function to focus, adjust, and/or redirect the signals from the environment to the detector sensor. The signal collector can include imaging optics, acoustic amplifiers (e.g., trumpets), filters, or any other suitable signal modification component. The imaging optics can be centered relative to the image sensor, positioned or formed to distort the collected return signal, or otherwise positioned relative to the image sensor. The imaging optics can include lenses (e.g., wide-angle lens, ultra wide-angle lens, normal lens, long focus lens, fisheye lens, etc.), mirrors, prisms, panoramic annular lenses, freeform refractive or reflective optics, or any other suitable set of optics. The imaging optics (e.g., lens) can be concentrically arranged with the detector sensor, offset from the detector sensor, or otherwise arranged. In one example (shown in FIG. 6), the detection system includes a panoramic annular lens offset from the detector sensor (e.g., offset from the center of the detector sensor's active surface), wherein a center of the panoramic annular lens is substantially aligned with (e.g., within manufacturing tolerances) or proximal an edge of the detector sensor, preferably the edge opposing the signal emission direction, but alternatively any suitable detector sensor edge. The panoramic annular lens can be offset such that 180°, 60°, 270°, or any suitable portion of the collected signal is sampled by the detector sensor. This can function to increase the resolution of the sampled signals, as more of the detector sensor's active surface (and/or resultant image) is being used to sample the scene regions of interest.

The imaging optics preferably include a band-pass filter matched to the emitted wavelength but can alternatively include a low-pass filter, any other filter, or no filter. The imaging optics are preferably axially symmetric, but can alternatively be radially symmetric, asymmetric, or have any other suitable symmetry. The imaging optics are preferably axially symmetric about the monitoring axis, but can additionally or alternatively be axially symmetric along the auxiliary axis or any other suitable axis. The imaging optics can be made of polycarbonate, polystyrene, glass, or any other suitable material. However, the detection system can include any suitable set of imaging optics and/or signal collectors.

In a first variation, the sensing system includes: an emitter configured to emit a source light (e.g., illumination unit); a signal shaper including emitter optics optically connected to the illuminator and configured to shape the emitted light into a narrow beam or sheet; a detection system including an image sensor; and a signal collector (e.g., including a wide-angle lens) with a field of view larger than a minor dimension of the narrow beam or sheet, such that the expected resultant image includes both bright pixels and dark pixels (example shown in FIG. 1).

In a second variation, the sensing system includes the components of the first variation, and additionally includes a set of splitting optics configured to split the emitted beam, pre- or post-light focusing, into multiple auxiliary beams directed in different directions (e.g., redirect a predetermined proportion of the emitted light at a predetermined angle relative to the main beam). The image sensor can have a field of view large enough to capture reflected light from both the main and auxiliary beams as well as dark pixels. Alternatively, the detection system can include multiple image sensors, each arranged and sized to capture reflected light from a main or auxiliary beam. However, the sensing system can be otherwise configured.

c. Additional Systems.

The sensing system can optionally include a control system. The control system can be responsible for any or all of the system operations, including: data routing, detector initialization, emitter driving, signal processing, surface parameter determination (e.g., distance determination, object detection), map generation, route management (e.g., planning, control, navigation, etc.), and/or any other operation. Alternatively, the sensing system can include one or more specialized control systems for each or a subset of the processes discussed herein. Alternately, any of the system components can be externally controlled, automatically controlled, or uncontrolled. The control system can be preferably combined with the processing system but can also be separate.

The sensing system can optionally include driver electronics, which function to control and synchronize emitter system and/or imaging system operation. The driver electronics preferably have a high clock frequency (e.g., 10 MHz to 200 MHz), but can alternatively have any other suitable clock frequency. In one variation, the driver electronics can control the imaging system to sample the image at the same frequency as beam or signal emission, with or without a delay. In a second variation, the driver electronics can control the imaging system to sample a series of images (e.g., with high shutter speeds, such as several hundred picoseconds, or low shutter speeds) for each beam pulse. However, the driver electronics can be otherwise operated.

The sensing system 100 can optionally include a processing system 400 that functions to determine object parameters from the recorded signal. The processing system can optionally control sensing system operation, control sensing system communication with external components, or perform any other suitable functionality. For example, the processing system can function to detect the presence of an object in the illuminated scene based on the recorded image, determine the object position relative to the sensing system based on the recorded image, determine the object distance from the sensing system based on the recorded image, identify the object based on the recorded image, or perform any other suitable functionality.

The processing system of the sensing system can determine environmental information based on the sampled signal(s). The processing system can process the signals in real- or near-real time, in batches, at a predetermined frequency, in response to processing event occurrence, or at any suitable time. In a first variation, the system can determine object presence in response to: bright pixel detection in the recorded image, returned signal detection in the recorded image, calculated distance (from the returned signal) falling within the system's detection range, or otherwise determined. In a second variation, the system can determine the relative object position (e.g., the angular object position relative to the sensing system) based on the location of the bright pixel(s), associated with the object, in the recorded image. In a third variation, the system can determine object distance from the sensing system based on phase shift between the emitted and received signal, time of beam or signal emission, time of signal receipt, pixel intensity, or otherwise determine the object distance. In a fourth variation, the system can detect transparent object presence based on errant bright pixel detection in the dark pixel regions. In a fifth variation, the system can determine transparent object parameters based on the pixel parameters of the errant bright pixels. However, the processing system can perform any other suitable process. The processing system can also filter, flag, bin, combine, average, smooth, de-warp, or otherwise pre- or post-process data (e.g., sampled signals, time series, etc.). The processing system can include on-board processors (e.g., CPU, GPU, TPU, microprocessor, ASIC, etc.), host processors, remote computing systems (e.g., auxiliary device processors, user device processors, server systems, etc.), a combination thereof (e.g., wherein raw or processed data is transmitted between the source system and processing system) or include any other suitable processor.

The sensing system 100 can optionally include a communication system 500, which functions to communicate data to an endpoint. The data can include object parameters (e.g., presence, relative position, distance, etc.), maps (e.g., of the floor, of the clothesline plane, etc.), operation instructions, calibration instructions, sensor data, or any other suitable information. The data can be transmitted at a predetermined frequency, at the sensor sampling frequency, in response to occurrence of a transmission event (e.g., error detection, recalibration, etc.), passed through (e.g., in real- or near-real time), or transmitted at any other suitable time. The data can be processed or unprocessed (e.g., raw). The endpoint can be a user device, a remote computing system, the host system (primary system), a second primary system, or be any other suitable system. The data can be transmitted through a wired connection, wireless connection, or any other suitable connection, using any suitable protocol. The communication system can be a wired communication system (e.g., Ethernet, vehicle data bus, etc.), a wireless communication system (e.g., WiFi, cellular, Thread, Bluetooth, UWB, NFC, etc.), or any other suitable communication system.

The sensing system 100 can optionally include auxiliary sensors 600, which can function to provide sensor inputs to the driver electronics for imaging system and/or emitter system operation. The auxiliary sensors can optionally provide inputs to the processing system for object parameter determination correction or modification. The auxiliary sensors can additionally or alternatively be host system sensors or another system's sensors, wherein the sensor outputs can be fed to the sensing system. Examples of the auxiliary sensors include optical sensors, such as ambient light sensors; orientation sensors, such as accelerometers, gyroscopes, IMUs, magnetometers, and altimeters; audio sensors, such as microphones; ranging systems, such as auxiliary TOF systems, LIDAR systems, or wireless signal trilateration systems; or any other suitable sensor. In a first example, the driver electronics can dynamically change the exposure time or emission power based on the ambient light detected by the ambient light sensor (e.g., decrease the exposure time with increased ambient light). In a second example, the processing system can incorporate sensing system kinematics (e.g., primary system kinematics) based on wheel encoders, motor power regulators, or any other suitable sensor information. However, the auxiliary sensors can be otherwise used.

The sensing system can include one or more auxiliary rangefinders, which function to augment and/or provide a reference point for sensing system calibration. The auxiliary rangefinder can be an active rangefinder, such as a laser rangefinder, LIDAR, radar, sonar, or ultrasonic rangefinder, a trigonometric rangefinder, such as a stadiametric rangefinder, parallax or coincidence rangefinder, or any other suitable rangefinder. The auxiliary rangefinder is preferably statically mounted a predetermined distance from the sensing system and/or components of the sensing system, but can be otherwise mounted. The auxiliary rangefinder is preferably different from the sensing system (e.g., thereby suffering from different drawbacks), but can alternatively be the same.

The sensing system can optionally include a power system. The power system can supply voltage or current at any appropriate level to any of the system components and/or source energy from an on-board power supply (e.g., rechargeable battery, solar system, thermionic system, energy harvesting system, etc.) or an external source. Alternately, the sensing system can be powered externally or be unpowered.

4. Method.

As shown in FIG. 3, the method of sensing system operation can include: emitting a signal beam S100; sampling the reflected signal at a sensor S200; and determining a surface parameter based on the sampled signal S300. The method can additionally or alternatively include: identifying a transparent, partially-reflective surface based on the sampled signals S400; determining obstacle parameters based on the sampled signals; generating a map based on a series of sampled signals S500 (e.g., sampled as the host system moves through a physical space); generating a distance record of the sensing system surroundings (e.g., a distance map, vector, point cloud, etc.); generating navigation instructions based on the distance record; calibrating the sensing system; or any other suitable process.

The method functions to determine the distances to external surfaces within the sensing system's line of sight (e.g., based on the signal return). The method is preferably performed in real- or near-real time (e.g., as the sensor signals are received), but can alternatively be performed asynchronously, after a predetermined delay, or at any other suitable time. Processes of the method are preferably performed in parallel, but can alternatively be performed sequentially or in any other suitable order. The method is preferably performed on-board the sensing system, but can alternatively be performed on-board the primary system incorporating the sensing system, be performed by a remote computing system, or be performed by any other suitable system. The method is preferably performed by or using the sensing system disclosed above, but can alternatively be performed by any other suitable system.

a. Emitting a Signal Beam

Emitting a signal beam S100 functions to emit a signal beam for subsequent recordation and analysis. The signal beam is preferably emitted by the emitter system, but can alternatively be emitted by an external system, be ambient light, or be emitted by any other suitable signal source. The signal beam can be emitted at a predetermined frequency (e.g., rate), in response to sampling event occurrence (e.g., the signal output by an auxiliary sensor satisfies a predetermined condition), at a time specified by a selected operation mode, at a time specified by a control system, or at any suitable time.

Emitting the signal beam can include: emitting a source signal S120 and forming a shaped signal from the source signal S140. However, the signal beam can be otherwise emitted.

Emitting the source signal S120 functions to emit a signal for scene irradiance. The signal preferably has a predetermined wavelength, but can alternatively have any suitable set of wavelengths. The signal is preferably infrared light (e.g., 850 nm), but can alternatively be light of any other suitable wavelength or be any other suitable signal. The signal can be collimated, uncollimated (e.g., divergent), or be otherwise structured. The signal can be a constant wave, a quasi-constant wave, continuous wave, a modulated signal, or be any other suitable signal. The modulated signal can be amplitude modulated, phase modulated, frequency modulated, polarization modulated, wavelength modulated, or otherwise modulated. The modulation frequency can be constant, variable, or otherwise configured. The signal is preferably emitted by an emitter system, more preferably the emitter of an emitter system, but can be emitted by an external system, be ambient light, or be emitted by any other suitable signal source. The emitter system preferably emits the signal at an emission time, which can be the time at which the emitter emits the signal, the time at which the signal leaves the emitter optics or emitter system, or be any other suitable time. Signal emission is preferably controlled by driver electronics (e.g., with high clock frequencies), but can alternatively be controlled by any other suitable system.

The signal is preferably emitted at or below a regulatory power limit (e.g., 1000 mW, 100 mW, 10 mW, 5 mW, etc.), but can alternatively be emitted at a higher power or at any suitable power. The signal emission duration is preferably predetermined and substantially short (e.g., 100 nanoseconds, 10 nanoseconds, etc.), but can alternatively be dynamically varied based on operation context (e.g., ambient light levels, ambient environment complexity, etc.) or any other suitable parameter, or otherwise determined. Emitting the signal preferably includes pulsing the signal at a predetermined frequency (e.g., emitting the signal at a predetermined frequency), at a varying frequency (e.g., dependent upon the operating context, auxiliary sensor signals, etc.), or any other suitable frequency. Alternatively, emitting the signal can include constantly emitting the signal (e.g., leaving the illumination unit on), and selectively shuttering or otherwise adjusting the emitted signal. The predetermined frequency can be manually determined, set by the emitter speed, set by the imaging system speed, determined based on the signal speed (e.g., speed of light) and maximum monitored range, or otherwise determined. The emission frequency is preferably selected such that serially emitted signals do not interfere with each other (e.g., the subsequent signal is preferably emitted after the first signal is recorded or dissipated), but can be otherwise selected. However, the signal can be otherwise emitted.

Figure 4:
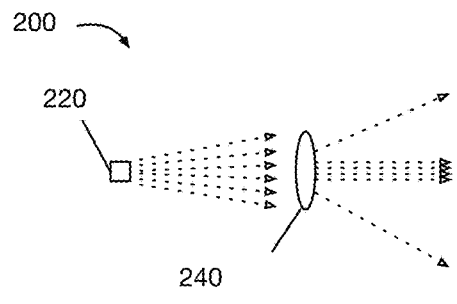
FIG. 4 is a schematic representation of the sensing system emitting a variant of the signal beam.

Forming a shaped signal from the source signal S140 functions to aggregate the photons within the photon budget into a controlled illumination region. This can function to increase the system's irradiance capabilities for the monitored scene region. The shaped signal is preferably a beam or sheet, more preferably a narrow beam or sheet, but can alternatively have any suitable geometry or configuration. The beam is preferably formed by modifying the emitted signal into the beam, but can alternatively or additionally be formed by the emitter (e.g., using a structured light source) or otherwise formed. The source signal is preferably shaped into the beam, but can alternatively or additionally be focused into the beam, directed into the beam, selectively interfered with (e.g., destructive and/or constructive) to form the beam, projected (e.g., passed through a filter or spatial light modulator), or otherwise modified to form the beam. All, a majority, more than a threshold percentage or proportion (e.g., 99%, 90%, 80%, 75%, 60%, etc.), a minority, less than the threshold percentage, or any suitable proportion of the emitted light is preferably used to form into the beam(s) (example shown in FIG. 4; e.g., one or more beams). However, portions of the emitted light can be blocked, redirected, or otherwise unused for scene illumination.

The emitted signal is preferably modified into one or more beams or sheets, oriented at predefined angles and/or positions, but can alternatively be formed into any other suitable pattern. For example, three, substantially parallel narrow beams can be formed from the emitted signal. The beam is preferably a narrow beam (e.g., a sheet), but can alternatively be a point source, a pattern (e.g., form structured light), or have any other suitable geometry. A narrow beam can be a beam having a minor cross-sectional axis (minor axis, auxiliary axis, etc.) smaller than a major cross-sectional axis (major axis, monitoring axis, etc.), a beam having a cross-sectional dimension smaller than an imaging sensor dimension, a beam having a cross-sectional dimension smaller than a predetermined value, such as 5 mm or 0.1 mm, or be otherwise characterized. The cross-section of the beam is preferably perpendicular the emission or illumination vector, but can alternatively or additionally be parallel the emission or illumination vector, or be defined at any suitable angle relative to said vector. The emitted signal is preferably modified using emitter optics (e.g., a focusing system, such as a set of mirrors or lenses), but can be otherwise modified.

The method can optionally include emitting one or more signals (and/or beams, wherein the descriptions below for multiple signals can also be applied to beams) from the emitter system. The multiple signals can be directed in the same direction, in different directions, or in any other suitable direction. The multiple signals can converge at a common point external the sensing system, be directed toward different illuminated scenes (e.g., within the same or different monitored regions), or be otherwise related. The multiple signals can be aligned in parallel, be perpendicular each other, or be otherwise arranged. When the multiple signals are aligned in parallel, the multiple signals are preferably aligned along the minor or auxiliary axis, but can alternatively be aligned along the major or monitoring axis or along any other suitable axis. In one example, the multiple signals originate from the same point, and are directed in different directions separated by predetermined angles. The multiple signals can have the same beam parameters (e.g., cross section, modulation frequency, modulation type, wavelength, amplitude, etc.), or different parameters. The multiple signals (and/or beams) can be emitted: concurrently, serially (e.g., one after another, according to a predetermined schedule or other time series, etc.), at overlapping times, or at any suitable time.

In a first variation, emitting multiple signals (and/or beams) includes controlling multiple emitters to emit the same or different signals (e.g., same modulation, same wavelength, same shape, same orientation, etc.). In a first embodiment, the multiple emitters can be separated by a predetermined distance (e.g., selected such that the signals do not interfere or have minimal interference). Alternatively, or additionally, multiple emitters can be collocated. The multiple emitters can be arranged: proximate (e.g., separated by a distance, touching, etc.), distal, parallel (e.g., with active faces aligned along a common plane), proud, recessed, or otherwise arranged relative to each other. In a second embodiment, the multiple emitters can be operated at different times. Alternatively, or additionally, multiple emitters can be operated at the same time. However, the multiple emitters can be otherwise configured and operated.

In a second variation, emitting multiple signals (and/or beams) includes splitting a common emitted signal into multiple sub-signals. In one embodiment, the signal is split prior to signal modification (e.g., shaping, focusing, etc.), where each sub-signal can be individually focused, directed, shaped, or otherwise modified to have the same or different signal parameter values (e.g., which can be predetermined, dynamically determined, or otherwise determined). In a second embodiment, the signal is split after signal focusing, where the focused beam is split into multiple discrete beams (e.g., by mirrors, lenses, etc.). In a third embodiment, the signal is split during signal focusing, where the common signal can be split and focused at the same time. In a specific example, emitting multiple signals includes splitting a common signal into three discrete beams, each separated by a predetermined separation angle. The three beams can be distributed vertically, such that the high beam is directed toward the primary system's head height, the low beam is directed toward the floor or support surface, and the central beam is directed straight ahead. However, the beams can be otherwise configured.

c. Recording the Reflected Signal at a Sensor

Sampling the reflected signal at a sensor S200 functions to record reflections of the emitted signals (e.g., in beam form) off surfaces of the ambient environment, wherein the emitted signals strike surfaces in the environment (e.g., object surfaces, structural surfaces, etc.) and is reflected back towards the system. The reflected signal is preferably sampled by a signal sensor, more preferably the detection system but alternatively any other suitable system, but can be otherwise recorded (e.g., sampled and stored), sampled, or otherwise measured.

The signal sensor (and/or resultant sample) preferably has a field of view (FOV) with one or more larger dimensions than the beam, such that the signal sensor (and/or sample) samples (or represents) a physical region larger than the region receiving the incident signal (e.g., the illuminated scene region). The signal sensor and/or sample can be associated with expected bright region(s) (corresponding to the portions of the scene expected to reflect the beam), and expected dark region(s) (corresponding to non-illuminated portions of the scene, or portions of the scene that are not expected to reflect the beam). The locations and dimensions of expected bright and dark regions within the image or sensor are preferably predetermined (e.g., based on the detector system position relative to the emitter system position, determined during calibration, determined based on the relative beam angles, etc.), but can alternatively or additionally be empirically determined (e.g., be the regions with the highest frequency of having bright pixels) or otherwise determined. However, the signal sensor (and/or signal) FOV or other parameter thereof can be equal to, smaller than, or otherwise related to the beam dimensions.

The reflected signal can be sampled at a predetermined frequency (e.g., the same frequency as signal emission, alternatively faster or slower), but can alternatively be performed at any other suitable frequency. Each emitted signal can be sampled one or more times. The signal is preferably sampled at a sampling time, wherein the sampling time can be a predetermined time duration after the signal and/or beam emission time; but can alternatively or additionally be sampled during a predetermined time window (e.g., from the emission time); be continuously sampled, or otherwise sampled. The sampling time can be the emission time, be a predetermined duration after the emission time (e.g., based on the signal time of flight or round-trip duration to a monitored distance), or be any other suitable recordation time. The monitored distance can be a minimum monitored distance, maximum monitored distance, expected surface distance, average monitored distance, or be any other suitable distance. In one variation, the same signal can be sampled multiple times (e.g., during the same or different exposure periods), wherein different sampling times can correspond to different physical distances from the sensing system. In this variation, the method can optionally include accounting for primary system motion between the emission and sampling time, between sequential sampling times, and/or during any other suitable timeframe. However, the signal can be sampled at any other suitable time.

Sampling the signal S200 can include: sampling an image of the monitored region including the illuminated scene; measuring the signal modulated parameter shift (e.g., phase shift, using a phase detector; amplitude shift, using pixel intensity; etc.); or sampling any other suitable parameter of the reflected signal. Sampling the reflected signal can optionally include: selectively opening and closing a built-in shutter at the same or similar frequency as signal emission, filtering out wavelengths excluded from the signal, focusing the reflected signal into the signal sensor, or otherwise modifying the sampled signal. Sampling the reflected signal can include: at a sampling time, operating the sensor for an exposure duration. The exposure duration can be predetermined, dynamically determined based on the ambient light (e.g., inversely related to the ambient light), or otherwise determined. The sampled measurement can be from a single sampling time, be a time-averaged measurement, be a statistical summary of a time series of measurements (e.g., change rate, standard deviation, etc.), or be any other suitable measurement. One or more signal samples (e.g., images) can be recorded during the exposure duration, wherein the object parameters can be extracted from or verified against the resultant time series. The receipt time can be the recordation time, a time during the exposure duration, or be any other suitable time.

Figure 7:
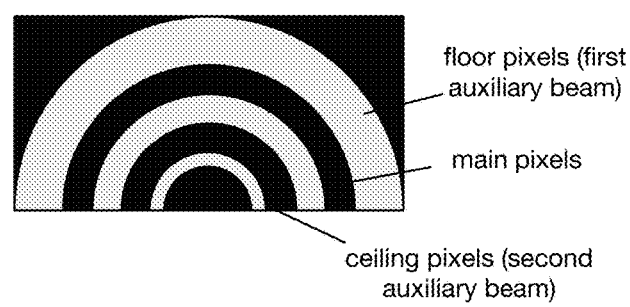
FIG. 7 is a specific example of pixels associated with a main beam, first auxiliary beam, and second auxiliary beam.

In variants including multiple emitted signals (e.g., including auxiliary signals), recording the signal can include recording the reflected signals from each emitted signal. Alternatively, the reflected signals from a subset of the emitted signals can be recorded. Recording the reflected signals can include: concurrently recording the reflected signals from different beams (e.g., concurrently or asynchronously emitted); asynchronously recording the reflected signals from different beams; or recording the reflected signals from different beams in any suitable order. The reflected signals from different beams are preferably recorded using a common detection system (e.g., signal sensor, detector sensor, image sensor, etc.), but can alternatively be recorded by different signal sensors (e.g., one for each signal; one for each sampling time; etc.). In a specific example, recording reflected signals from different beams includes recording reflected signals from all concurrently emitted beams at a common signal sensor, such that the resultant signal (e.g., image) includes measurements for each reflected beam. This signal can additionally or alternatively include signals for the interstitial spaces between the beams, spaces around each beam (e.g., above, below each beam), or signals for any other suitable physical region. Each beam can be associated with a predetermined set of pixels, predetermined scene region (e.g., relative to the host system), and/or other spatial data. In one example, a horizontal main and auxiliary beam can be associated with a main pixel set and auxiliary pixel set, wherein the pixels within each set share a common polar angle (and/or are associated with a predetermined set of polar angles), and wherein the main pixel set and auxiliary pixel set are separated by a predetermined polar distance (specific example shown in FIG. 7). However, the reflected signals from different beams can be otherwise recorded.

d. Determining a Surface Parameter Based on the Recorded Signal.

Determining a surface parameter based on the recorded signal S300 functions to characterize the monitored region (e.g., ambient environment surrounding the primary system, the sensing system, etc.). The monitored region characterization can be used to generate scene maps, navigation instructions (e.g., host system control instructions), or used in any other suitable manner. The monitored region can include surfaces in the environment struck by the emitted beam, or be otherwise defined. The surface parameters are preferably determined in real- or near-real time, as the signals are sampled, but can additionally or alternatively be determined after a delay, in batches, after a characterization event (e.g., an auxiliary sensor indicates that there is an obstacle within the sensing system's line of sight), or at any suitable time. The surface parameters can be determined by the on-board processing system, the host processing system, a local computing system (e.g., device connected to a common local wireless network), a remote computing system (e.g., server system), or any other suitable system.

Determining the surface parameter S300 can include: determining pixel parameters for each of a set of pixels S320, and determining the surface parameter based on the pixel parameters S340. However, the surface parameter can be otherwise determined.

In variants with multiple emitted signals, the same or different surface parameter determination methods can be applied to samples for different reflected signals. For example, a first method can be applied to a main beam, while a second method can be applied to the auxiliary beams (e.g., based on the emitted beam parameters, the beam's spatial position, etc.).

Determining the pixel parameters S320 function to determine raw data from which scene characterizations can be extracted. The set of pixels can be: pixels associated with expected illuminated scene regions (e.g., bright scene regions), pixels associated with expected non-illuminated scene regions (e.g., dark scene regions), pixels within an expected pixel region (e.g., bright pixels within one or more expected bright regions, wherein the bright region can be a bright image region, bright pixel region, bright scene region, or other bright region; dark pixels within one or more expected dark regions wherein the dark region can be a dark image region, dark pixel region, dark or non-illuminated scene region, or other dark region), all bright pixels, all dark pixels, errant pixels (e.g., bright pixels within the expected dark region, dark pixels within the expected bright regions), all pixels, pixels having a predetermined set of indices, pixels corresponding to a detected obstacle (e.g., previously detected using the sensing system, detected using an auxiliary sensor, etc.), adjacent pixels (e.g., pixels within a grid unit, a cluster, etc.), or any other suitable set of pixels. The set of pixels used to determine the pixel parameters can be dynamically determined, predetermined, or otherwise determined based on beam parameters, individual pixel parameters, noise parameters, or any other suitable information.

In a first variation, pixels corresponding to a high-irradiance region (e.g., with a majority of the photon budget; main beam; etc.; image region, scene or ambient environment region, etc.) can be evaluated on an individual basis. In a second variation, pixels corresponding to low-irradiance regions (e.g., less than a threshold irradiance or proportion of the photon budget; auxiliary beam; etc.; image region, scene or ambient environment region, etc.) can be aggregated (e.g., binned or clustered together), wherein the resultant pixel value can be assigned to a larger region represented by the cluster. The aggregated value can be a mean, median, weighted average, or other aggregate measure of the underlying pixels' parameters. The pixels can be clustered using: a grid or matrix, based on shared pixel parameters, based on anticipated shared surfaces (e.g., determined using an auxiliary range-finding system), or otherwise clustered. The cluster shape, size, number, or other parameter can be predetermined, dynamically determined (e.g., based on the reflected signal strength, the signal-to-noise ratio, the detected distance, the illumination power, the incident surface angle, the ambient light, etc.), or otherwise determined. For example, a larger grid unit can be used when the estimated surface distance is further away, or when the illumination power for the beam is lower. However, the pixel set can be otherwise selected.

Figure 9:
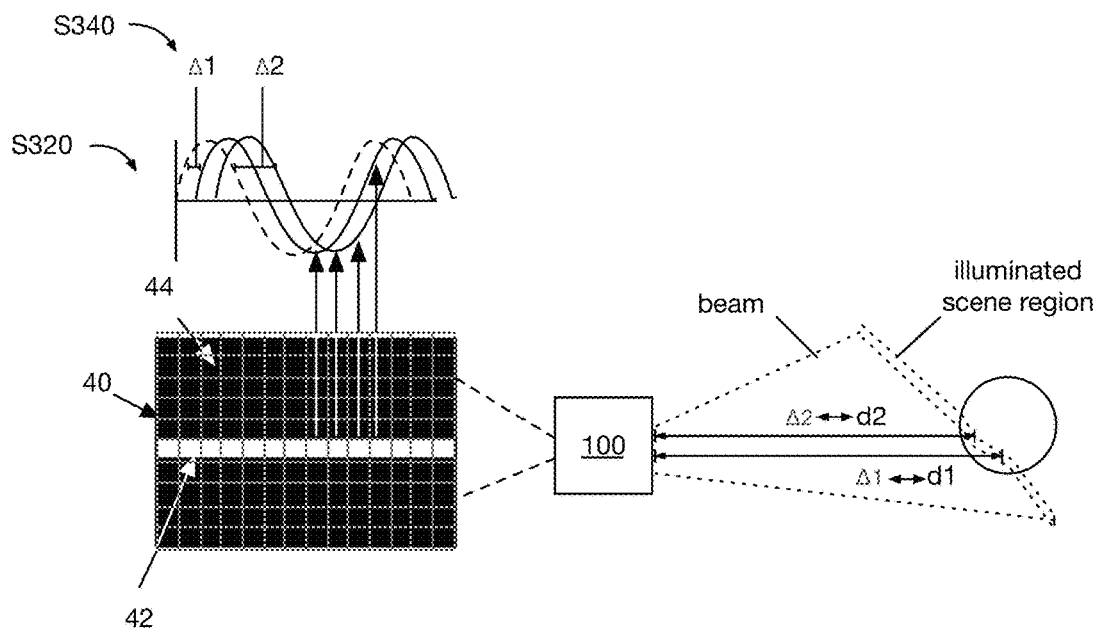
FIG. 9 is an example of determining the per-pixel distance of a scene surface.

The pixel can be a sensor pixel, an image pixel, or pixel of any other suitable component or scene representation. Pixel parameters can include: signal phase; signal magnitude or intensity; modulation shift (e.g., phase shift, amplitude shift, etc.) and/or parameters thereof (e.g., amount, duration, etc.); color; wavelength; hue; saturation; pixel depth (e.g., represented distance); parallax shift; number, pattern, density, distribution, or other spatial characterization of pixels having a shared parameter value; spatial characterization of different pixel groups (e.g., separation distance between groups of bright pixels); classification (e.g., bright or dark pixel); or any other suitable parameter. The pixel parameters can be sampled by the detector sensor, calculated from the detector sensor signals, or otherwise determined. For example, the distance associated with each pixel can be calculated from the modulation shift (example shown in FIG. 9), the sampling time, and the emission time. However, the pixel parameters can be otherwise determined.

Determining the surface parameters based on the pixel parameters S340 functions to characterize the scene's surfaces. The characterized surfaces are preferably those illuminated by the band, but can alternatively or additionally be secondary surfaces, such as those illuminated through multipathing effects. The surface parameters can include: surface presence, distance (e.g., relative to the sensing system), angular position relative to the system (e.g., azimuthal, polar, etc.), geometry (e.g., obstacle geometry, terrain), pose, kinematics, or any other suitable parameter. The surface parameters can be determined based on the pixel parameters, the sensing system pose relative to the host system, the host system kinematics (e.g., location, velocity, acceleration, etc.), host system orientation, and/or any other suitable parameter. The surface parameters can be calculated (e.g., using a neural network, a rule set, etc.), selected, or otherwise determined.

When multiple beams are emitted, different surface (or object) parameter expectations can be associated with each respective return signal. For example, the floor beam (e.g., cliff, low beam) can be associated with an expected object (e.g., floor) presence, the main beam (e.g., middle beam) can be associated with no expected object presence, and the ceiling beam (e.g., clothesline beam, high beam) can be associated with no expected object presence (e.g., surfaces too far away for the sensor to sample). In a specific example, the method can include: detecting an obstacle (e.g., object) in response to the range (e.g., external surface distance) for a pixel within the main pixel set falling below a distance threshold; and detecting an obstacle (e.g., void) in response to the range for a pixel within the auxiliary pixel set (e.g., floor pixel set) exceeding a second distance threshold and/or not returning a signal. The method can optionally include emitting a second auxiliary beam, and detecting an obstacle (e.g., an object) in response to the range for a pixel within the second auxiliary pixel set (e.g., ceiling pixel set) falling below a distance threshold. The distance thresholds can be the same for each beam, different (e.g., the main beam associated with a longer threshold, etc.), or otherwise related. The distance threshold(s) can be predetermined (e.g., static, set according to a predetermined equation, etc.), dynamically determined, or otherwise determined. The distance thresholds can be determined based on the host system's (navigation) response time, host system orientation (e.g., tilt), host system global location, host system location within a predetermined map, ambient environment parameters (e.g., ambient light), obstacles detected in the scene, parameters of obstacle within the scene (e.g., size, shape, class, pose, position, etc.), or otherwise determined. However, each beam can be associated with a different expected object or surface parameter.

In a first example of surface parameter use, the method can include: detecting an obstacle within the illuminated scene and generating navigation instructions (e.g., to arrive at a predetermined endpoint or set of waypoints) to avoid the obstacle. The obstacle is preferably an unexpected feature in the monitored scene, but can be any other suitable feature. The obstacle can be a physical object, a void, or be any suitable obstacle. In a second example, the method can include: detecting the absence of an expected object (e.g., floor) within the illuminated scene (e.g., detecting a hole or void), and generating navigation instructions to avoid the regions lacking the expected object. In a third example, the method can include: determining characteristics of the surface (e.g., angle relative to a gravity vector or other reference vector, surface roughness, etc.) and generating navigation instructions based on the host system capabilities and the surface characteristics (e.g., avoiding regions that the host system is incapable of traversing). However, the surface parameters can be otherwise used.

In a first variation, determining a surface parameter includes detecting the presence of an object in the illuminated scene. Additionally or alternatively, determining the surface parameter can include: detecting the absence of an object in the illuminated scene, wherein the object (e.g., floor) can be expected in the scene; detecting a void or hole in the scene; or detecting the presence or absence of any other suitable scene feature (e.g., surface) within the illuminated scene. Detecting the presence of an object in the illuminated scene can include identifying bright pixels in the resultant image, wherein bright pixels can be associated with a diffusely reflective surface. Bright pixels can be pixels with an intensity above a threshold intensity (e.g., identified using a filter), pixel groups (e.g., multiple contiguous pixels) of pixels having an intensity above the threshold intensity, pixel groups having an average intensity above the threshold intensity, pixel sets having a modulation shift above a threshold value, pixel sets with parameter values differing from the neighboring pixels by a threshold amount, more or less than a threshold amount, or be otherwise characterized. Alternatively, the pixel parameter values (and/or surface parameter values) determined from one or more concurrently sampled beam reflections can be compared against an expected set of parameter values determined based on a predetermined scene topography, wherein an object can be detected when the sampled values differ from the expected values. However, the object presence (or absence) can be detected in any other suitable manner.

In a second variation, determining a surface parameter includes determining the surface's angular position relative to the sensing system based on the recorded image. In one embodiment, a relative surface position is determined based on the angular position associated with the pixels sampling the surface represented within the resultant image. In an example, wherein the beam is directed with a major axis arranged horizontally, each lateral pixel position within the image is associated with a different lateral angular position relative to the sensing system. For example, a bright pixel appearing in a far right pixel in the image is indicative of an object to the right of the sensing system. In a second example in which the emitter system emits a top, middle, and bottom horizontal beam, the surfaces detected from bright pixels appearing in each expected bright region (e.g., bright band) can be mapped to: a predetermined altitude corresponding to the top, middle, and bottom beams, respectively, and a predetermined lateral angular position (azimuthal angle) corresponding to the pixel's lateral position within each band (example shown in FIG. 12). In a specific example of the second example, the top and bottom beams can be weaker than the middle beam, and be used to detect the "ceiling" (e.g., head height) and floor topographies (e.g., detect an obstacle presence, such as along the navigation route; floor absence, such as at the top of the stairs). However, the relative surface position can be determined in any other suitable manner.

In a third variation, determining a surface parameter includes determining an object distance from the sensing system based on the recorded signal.

In a first embodiment, determining an object distance includes determining the modulation shift between the received signal and the emitted signal, and calculating the distance from the modulation shift (e.g., phase shift, amplitude shift). Determining the distance based on the modulation shift can include using a predetermined shift-to-distance map, calculating the distance based on the shift amount, or otherwise determining the distance.

In a second embodiment, determining an object distance includes measuring the reflectance duration (e.g., the difference between the emission time and the time of arrival) and calculating the distance based on the reflectance duration and the signal speed (e.g., speed of light).

In a third embodiment, determining an object distance includes determining the intensity of each pixel within the resultant image (e.g., the recorded signal), and determining the distance based on the pixel intensity (e.g., with different intensity values or ranges corresponding to different distances). Determining the distance based on the pixel intensity can include using a predetermined intensity-to-distance map, calculating the distance based on the pixel intensity, or otherwise determining the distance. The distance determination can additionally or alternatively be determined based on the ambient light (e.g., as measured by the ambient light sensor), the exposure duration, the relative emission intensity or otherwise determined. For example, the determined distance can be increased as a function of increasing ambient light or exposure duration.

When combined with the second variation, the third variation can result in a range map, where the angular positions of points are determined based on the pixels and the range (distance) is determined based on the signal return. In one example where a narrow beam is emitted, the pixels (or contiguous set thereof) in the bright band within the recorded images can each be mapped to a predetermined angular position. The distances for each angular position can be determined based on the pixel intensity of the pixel associated with the respective angular position. In a specific example, the emitted beam spans 180°, and the angular positions between 0° and 180° can be divided into ½° intervals. One or more pixels can be assigned to each interval. This can result in a vector of ranges. In one example, each position within the vector can be associated with an interval position, and the value of the position can be indicative of the object distance at the respective interval position. In a second example, the pixels can be associated with direction vectors, and the range information can be combined with said direction vectors to create a point cloud for display or use by a host or external system. However, the object distance can be otherwise represented and mapped.

In a fourth embodiment, determining an object distance includes determining the surface distance based on the beam emission angle and the resultant pixel position of the reflected beam. For example, a beam emitted at a non-zero angle to the normal vector of the detection sensor active surface can be treated as structured light, wherein the distance can be determined from deviations from a predetermined reflected beam shape or pattern. In this embodiment, determining the distance can include: using a predetermined map correlating the shift distance, shift pattern, or other shift parameter to a distance or distance adjustment; calculating the distance (e.g., using the distance adjustment) from a reference distance for a reference pixel (e.g., wherein the reference distance can be calculated based on a modulation shift, etc.); or otherwise determined. In a specific example, medial bright pixel shifts can be associated with closer surfaces, while distal pixel shifts (e.g., pixel shifts away from the image median) can be associated with further surfaces. However, the object distance can be determined in any other suitable manner.

In a fourth variation, determining the surface parameter includes determining the surface material properties, wherein different material properties can be associated with different pixel parameter values and/or changes. The association between the material properties and pixel parameter values can be: predetermined, empirically determined, learned, or otherwise determined. In one embodiment, the surface color can be determined based on the wavelengths absorbed by the surface (e.g., emitted, but not reflected, wavelengths). In a second embodiment, the surface reflectivity can be determined based on the intensity change between the emitted and reflected signal. In a third embodiment, the surface reflectivity can be determined based on bright pixel shift (e.g., errant bright pixels appearing in an expected dark region of the sampled signal, pixels associated with errant illuminated regions detected in the virtual scene representation, etc.). The shift pattern, distance, or other parameter thereof can be associated with different materials and/or effects. In a first example, a shift pattern associated with diffuse reflections (e.g., scattered bright pixels) can be associated with multipath effects, and ignored, associated with diffuse surfaces, used to correct the surface parameters determined using bright pixels in the expected bright region, or otherwise used. In a second example, a consistently shifted block of bright pixels can be associated with a smooth, specular reflection (e.g., glass). However, the surface material properties can be otherwise determined.

Figure 18:
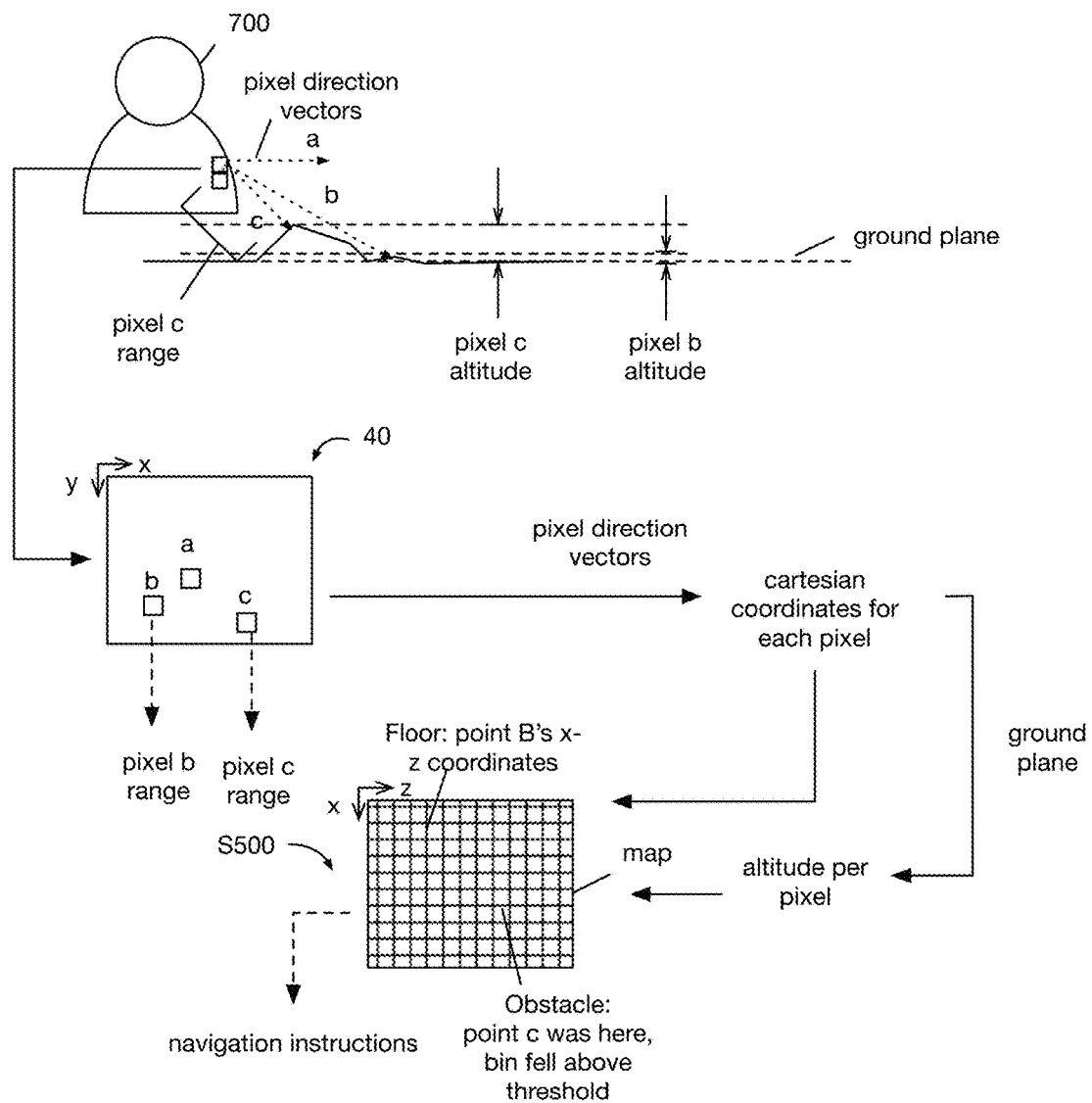
FIG. 18 is a schematic example of plane terrain determination.

In a fifth variation, determining a surface parameter includes determining the terrain of a plane based on the recorded signal. This can function to monitor the auxiliary or minor axis of the scene (e.g., vertical axis, horizontal axis, etc.). This can be particularly useful when the primary system is moving through the monitored volume and/or when the signal strikes the plane at a non-normal angle. In one example (specific example shown in FIG. 18), determining the terrain of a plane can include: determining the range information and altitude for each of a set of pixels within a resultant image, assigning a first classification (e.g., "low" or "cliff") to the pixels having altitudes below a first threshold altitude and assigning a second classification (e.g., "high" or "raised") to pixels having altitudes above a second threshold altitude. The altitude for each pixel can be determined based on the angular pixel vectors and a ground surface normal vector or gravity vector determined by an accelerometer, another sensor, simply by fiat, and/or otherwise determined. In a specific example, the floor can be defined by a plane fit to points that fall into the floor region (optionally rejecting outliers) and the altitude defined as a normal distance to that floor plane. However, the pixel altitude can be otherwise determined. The example can additionally or alternatively include assigning a "floor" classification to pixels with altitudes falling between the first and second thresholds, pixels with altitudes falling within a predetermined range of a given altitude, or pixels satisfying any other suitable condition. The example can additionally or alternatively include assigning an "unknown" classification to pixels with altitudes falling on the border of different altitude ranges, pixels with unknown altitudes, pixels that seem anomalous based on adjacent pixel values, or any other suitable pixel. In a specific example, this can result in a terrain or altitude map (e.g., of the floor) with a classification for each unit region of the plane, a subset of the plane regions, a virtual object representation within the virtual scene representation (e.g., obstacle points), or for any suitable set of physical regions, virtual regions, or pixel regions.

In a second specific example, the floor can be defined by identifying a first return signal (e.g., pixel associated with the shortest range) within a set of pixels associated with a floor beam and setting the range extracted from the first return signal as the floor height or distance from the system. Additionally or alternatively, the first return signal can be the signal corresponding to the shortest range that is within a predetermined confidence interval of an estimated floor distance. The estimated floor distance can be: empirically determined, predetermined (e.g., based on the host system height or system placement on the host system), dynamically determined (e.g., based on system or host system tilt, as sampled by on-board sensors), or otherwise determined. However, the first return signal can be otherwise determined. The pixels associated with floor beam can be pixels within a predetermined image region, pixels associated with a predetermined angular position (e.g., predetermined set of polar angles, etc.), or be any suitable set of pixels. The floor can be represented in the virtual scene representation as a plane arranged the floor distance away from the system, wherein the angular orientation of the floor relative to the host system can be determined by fiat, determined based on the host system (e.g., based on host system tilt, as sampled by host system orientation sensors), or otherwise determined. Obstacles can be detected (from the pixels associated with the floor beam) as surfaces with a height (e.g., z height) higher than the floor height. In one variation, this includes: determining a scene range for each pixel in the set, mapping the scene ranges to a virtual scene representation based on the scene position associated with the respective pixel, and determining obstacles as surfaces above the virtual floor based on the virtual scene representation. However, obstacles can be otherwise determined. Alternatively or additionally, voids (e.g., cliffs, steps, etc.) can be detected as missing surfaces or surfaces with a height less than the floor height. However, the floor can be otherwise determined.

In a sixth variation, determining the surface parameter includes determining object parameters. Object parameters can include: an object identity (e.g., class, subclass, etc.), object geometry, object pose, or any other suitable parameter. In one embodiment, the surface parameters determined from one or more concurrently sampled beam reflections can be used to generate a virtual scene representation, wherein objects can be detected from the virtual scene representation using pattern matching (e.g., matching a predetermined object geometry to the virtual scene slices), histograms (e.g., by calculating a histogram of gradients and matching the gradient vectors to a predetermined set of vectors), or otherwise determined. In a second embodiment, each pixel can be associated with a distance-based area map that correlates the scene footprint represented by a pixel for each of a set of distances. In this variation, the method can include: identifying the object pixels associated with the obstacle, determining the pixel distance for each object pixel, determining the area for each object pixel based on the area map and respective pixel distance, and calculating the obstacle size based on the areas collectively represented by the object pixels. However, the object parameters can be otherwise determined.

In an example of the method, the method can include: emitting a first, second, and third beam from a common emission point; recording a measurement (e.g., image) encompassing reflected signals from the first, second, and third beams; and determining the obstacles in three different physical regions corresponding to the first, second, and third beam directions, respectively. In a specific example, the first beam can be a high beam, the third beam can be a low beam, and the second beam can be a center beam. The recorded image can include a high, middle, and low band corresponding to the high, center, and low beams. The ceiling or head-height terrain can be determined from the high band, the floor or cliff-height terrain can be determined from the low band, and obstacles in the traversal path can be determined from the middle band. However, the method can be otherwise performed.

The method can optionally include identifying transparent, reflective surfaces S400, such as glass, from the recorded signal. Identifying transparent surfaces can function to identify the presence of the transparent surface, the location of the transparent surface, the distance of the transparent surface, the type of transparent surface (e.g., based on the reflection pattern), the shape of the transparent object, or any other suitable parameter of the transparent surface. Identifying transparent surfaces includes: identifying errant regions and detecting the transparent surface presence based on the parameters of the errant regions. However, the transparent surfaces can be otherwise detected.

Identifying errant regions preferably includes identifying bright regions deviating from an expected bright region or pattern (e.g., detecting the bright regions in an expected dark regions), but can alternatively include identifying bright regions within an expected dark region, identifying dark regions deviating from an expected dark region, or otherwise identified. The regions can be: pixel regions (e.g., image pixels or sensor pixels), scene regions, or any other suitable region. The expected bright region pattern is preferably the regions from which (or pixels at which) the reflected signal is expected to be received, but can be otherwise defined. When the expected bright region is an expected bright scene region, the expected bright scene region can be a scene region within the virtual scene representation associated with signal return. The expected bright scene region can be: empirically determined (e.g., using calibration, historic signals, etc.), a predetermined region in the virtual scene representation (e.g., based on the system position on the host system, the beam parameters such as beam dimension, etc.), pre-associated with the host system (e.g., be a predefined bright region within the host system's coordinate system), or otherwise determined. When the expected bright region is an expected bright pixel region, the expected bright pixel region can have one or more pixels along the auxiliary axis (e.g., along the minor axis, in height, etc.), multiple pixels along the monitoring axis (e.g., along the major axis, in width, etc.), or have any suitable dimension. The expected bright region pattern (e.g., band pattern) can be predetermined (e.g., based on the beam parameters, such as beam dimensions, phase, modulation, etc.), dynamically determined (e.g., based on triangulation or sensing system or primary system tilt), determined based on a secondary band from a secondary beam (e.g., indicative of object presence), or otherwise determined. However, errant pixels can be otherwise identified.

In a first variation, detecting the transparent surface includes identifying errant pixels (e.g., determining a bright pixel in an expected dark pixel region, detecting a band shift from an expected pixel position).

In a second variation (example shown in FIG. 13), detecting the transparent surface presence includes identifying a consistent shift in errant pixels (e.g., wherein a threshold number of errant pixels, or errant pixel population, is shifted by a consistent pixel distance, phase, etc.).

Figure 14:
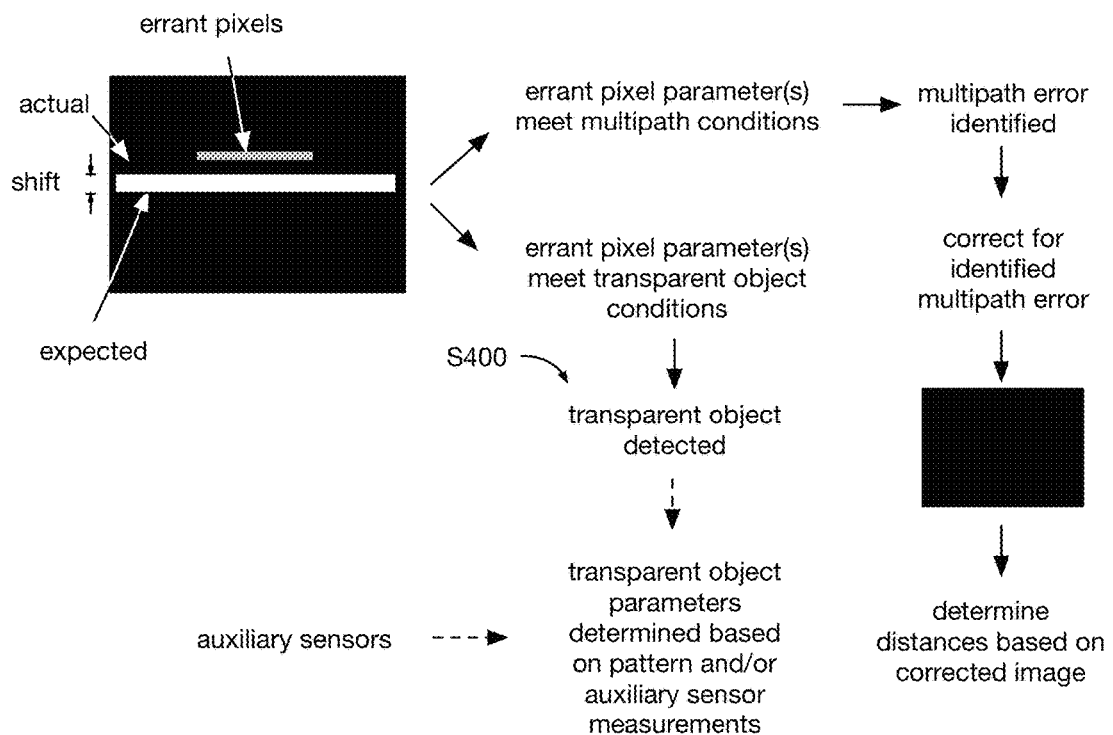
FIG. 14 is an example of detecting multipath errors and/or transparent objects based on errant pixels.

In a third variation, detecting the transparent surface presence includes identifying a population of errant pixels, wherein the population satisfies a predetermined population condition (example shown in FIG. 14). The predetermined population condition can include: matching a predetermined pattern (e.g., wherein the errant pixel population substantially matches the pattern, which can be machine-learned, associated with a modulation pattern or phase, or otherwise determined), having a predetermined number of pixels, having a predetermined concentration of pixels, having an average or median intensity above a threshold intensity, or satisfying any other suitable condition.

In a fourth variation, detecting the transparent surface includes determining an object or obstacle position from a first band, determining an expected band parameter (e.g., intensity, position, sharpness, etc.) for a second band based on the determined obstacle position, comparing the expected band parameter to the actual band parameter, and detecting a transparent surface in response to a band parameter deviation between the actual and expected bands. However, a transparent surface can be otherwise determined.

In a fifth variation, detecting the transparent surface includes: identifying errant pixels, detecting a reflective surface (e.g., specular reflective surface) based on the errant pixels, and detecting no object from a corresponding set of pixels within the expected bright pixel region (e.g., detecting a distance beyond a predetermined threshold, the corresponding set of pixels' distances are substantially similar to other pixels' distances within the expected bright pixel region, etc.); example shown in FIG. 15. The corresponding set of pixels can be pixels within the expected bright pixel region that are aligned with the errant pixels (e.g., vertically aligned, horizontally aligned, etc.), or be any other suitable set of pixels. However, the transparent object can be otherwise determined.

The method can optionally include generating a virtual representation of the scene (e.g., a scene map) S500. The virtual representation is preferably generated based on the scene parameters per pixel, but can additionally or alternatively be generated based on the host system kinematics, host system pose (e.g., orientation, location, etc. relative to the scene), or any other suitable information. In one variation, the surface parameters (e.g., surface distances) determined from each pixel is mapped to the spatial position corresponding to the respective pixel to generate a vector cloud or point cloud. In this variation, the method can optionally include incrementally mapping a physical space as the host system moves the sensing system relative to the space (e.g., wherein the point cloud or other virtual representation of the scene can be generated slice-by-slice; example shown in FIG. 16) or relative to the space (e.g., as the host system rotates; example shown in FIG. 17). Each local virtual representation (e.g., slice, determined using the sensing system) can be mapped to a global virtual representation of the scene. For example, the location of the local virtual representation within the global virtual representation can be determined based on the host system location (e.g., using a GPS system, indoor location system, other location system, etc.), host system kinematics (e.g., using odometry to track the sampling location relative to a reference location), or otherwise determined. In a second example, generating the global representation can include generating a coordinate transform based on the host system orientation (e.g., pitch, yaw, roll) that transforms the host system coordinates and/or sensing system coordinates to global coordinates, and transforming the virtual scene representation based on the coordinate transform. In a specific example, the method includes generating a series of virtual scene representations using the method, and stitching the virtual scene representations together based on the host system movements (e.g., as determined from on-board sensors, host system control instructions, etc.). However, the virtual scene representation can be otherwise generated.

The method can additionally or alternatively include calibrating the sensing system. The calibration is preferably performed in-situ (e.g., in-field), but can alternatively be performed when the primary system is in a standby state or at any other suitable time. The calibration is preferably performed in real- or near-real time (e.g., for each signal measurement), but can be performed at any other suitable frequency. The calibration is preferably performed automatically, but can alternatively be performed manually, teleoperatively (e.g., wherein the calibration is performed by or at a remote computing system and sent to the sensing system), or performed by any other suitable system. The sensing system can be calibrated using the recorded signal for a single beam (e.g., the dark pixels and bright pixels for a single beam; etc.), the recorded signals for multiple beams (e.g., using the signal from a first beam as a reference point for a second beam), the expected dark pixel and bright pixel locations for a beam, a series of reflected signal measurements recorded over time (e.g., calibrated or verified using the beam parameter changes over time, etc.), the signals recorded by a secondary rangefinding system, or calibrated using any other suitable set of information. Calibrating the sensing system can include: correcting for multipath errors, correcting for ambient light (e.g., using ambient light measurements), correcting for signal interference, or correcting for any other suitable error.

In a first variation, calibrating the sensing system can include: identifying errant bright regions in the expected dark regions and dynamically correcting for multipath interference based on the errant bright regions. In a first embodiment, the errant bright regions are illuminated scene regions, detected from pixel signals, located within expected non-illuminated scene regions. In this embodiment, the pixel signals can be converted to a virtual scene representation, wherein the virtual scene representation can be associated with expected illuminated regions and expected non-illuminated regions. The expected illuminated and non-illuminated regions can be determined based on the emitted beam pose (e.g., position and/or orientation) relative to a reference frame (e.g., a global coordinate system, host system coordinate system, etc.), the emission parameters (e.g., emission intensity, angle, etc.), or otherwise determined. In a second embodiment, the errant bright regions are bright pixel regions detected in expected dark pixel regions within the image recorded by the sensor. However, the expected bright and dark regions can be any suitable region.

In a first embodiment, dynamically correcting for multipath interference can include: subtracting, ignoring, discounting, filtering, correcting (e.g., using sparse reflection analysis, random forest training algorithms, iteratively optimized, etc.), or otherwise processing the image to remove the errant bright pixels from the expected dark pixel region and/or ignore the distance signals from the errant bright pixels (example shown in FIG. 14). In a second embodiment, dynamically correcting for multipath interference can include determining the intensity of the errant bright pixels (e.g., average intensity, etc.) and subtracting the errant bright pixel intensity from the bright pixels (in the expected pixel positions) prior to distance determination. However, the sensing system can otherwise calibrate for multipath errors based on the expected dark pixel and/or bright pixel positions.

In a second variation, calibrating the sensing system can include: identifying the edges of a band, identifying bright pixels outside of the band edges (e.g., scatter, halo) as errant bright pixels, removing the errant bright pixels from the image (e.g., to correct for multipath errors), and determining the object distance based on the processed image.

In a third variation, calibrating the sensing system can include: recording a primary measurement for a monitored region using the sensing system, recording a secondary measurement for the same monitored region using a secondary range-finding system, and calibrating the sensing system based on the secondary measurement. In a first embodiment, calibrating the sensing system based on the secondary measurement can include identifying a common sub-region or object shared between the primary measurement and secondary measurement and iteratively adjusting a parameter of the sensing system until the object distance derived from the primary measurement substantially matches the object distance derived from the secondary measurement. The common sub-region or object can be determined using dead reckoning (e.g., wherein the relative positions of the sensing system and secondary range-finding system are fixed and known; wherein pixels of the sensing system are pre-mapped to pixels of the secondary range-finding system, etc.), using object recognition (e.g., wherein the same object or feature are recognized in both measurements), or otherwise determined. However, the sensing system can be otherwise calibrated.

The method can additionally or alternatively include calibrating the secondary range-finding system using sensing system measurements. In one variation, this can include: recording a primary measurement for a monitored region using the sensing system, recording a secondary measurement for the same monitored region using a secondary range-finding system, and iteratively adjusting the secondary range-finding system parameters until the pattern of measured distances substantially match (e.g., within a predetermined range of error). However, the secondary range-finding system can be otherwise calibrated.

Embodiments of the system and/or method can include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. An environment mapping method, comprising:
emitting source light;
shaping more than a threshold proportion of the source light into shaped light;
splitting the shaped light into a main light beam and an auxiliary light beam;
illuminating an external scene with the main light beam, the main light beam having a minor dimension;
monitoring an auxiliary axis of the external scene with the auxiliary light beam, the auxiliary axis of the external scene extending along the minor dimension of the shaped light;
sampling an image of the illuminated external scene, the image having a field of view larger than the minor dimension;
determining pixel parameters for each pixel of a set of image pixels from the image, wherein the set of image pixels comprise a main pixel set, associated with the main light beam, and an auxiliary pixel set, associated with the auxiliary light beam;
for each pixel of the set of image pixels, determining an external surface distance based on the determined pixel parameters;
generating a virtual scene representation comprising the external surface distance for each pixel of the set of image pixels mapped to a predetermined virtual angular position corresponding to the respective pixel;
detecting an object in response to the external surface distance for a pixel, within the main pixel set, falling below a distance threshold; and
detecting a void in response to the external surface distance for a pixel, within the auxiliary pixel set, exceeding a second distance threshold.

2. The method of claim 1, wherein the source light is emitted at an average optical power between 10 mW and 2 W.

3. The method of claim 1, wherein the source light is emitted by an IEC-60825 Class 1 laser emitter.

4. The method of claim 1, wherein the image is sampled using a set of axially symmetric optics.

5. The method of claim 1, wherein the image is sampled by a detection system comprising a detector sensor having an active surface and a panoramic annular lens arranged offset from a center of the active surface.

6. The method of claim 1, wherein the shaped light comprises modulated light, wherein determining pixel parameters comprises determining a modulation shift in reflected light from the image, wherein the external surface distance is determined based on the modulation shift, an illumination time, and an image sampling time.

7. An environment mapping method, comprising:
emitting source light;
shaping more than a threshold proportion of the source light into shaped light;
illuminating an external scene with the shaped light, the shaped light having a minor dimension;
sampling an image of the illuminated external scene, the image having a field of view larger than the minor dimension, wherein the image is sampled by a detection system comprising a detector sensor having an active surface and a panoramic annular lens arranged offset from a center of the active surface;
determining pixel parameters for each pixel of a set of image pixels from the image;
for each pixel of the set of image pixels, determining an external surface distance based on the determined pixel parameters; and
generating a virtual scene representation comprising the external surface distance for each pixel of the set of image pixels mapped to a predetermined virtual angular position corresponding to the respective pixel.

8. The method of claim 7, further comprising monitoring a first region of the external scene and a second region of the external scene, wherein the second region is separated from the first region by a predetermined angle extending along the minor dimension of the shaped light; wherein the second region is monitored with an auxiliary light beam.

9. The method of claim 8, further comprising splitting the shaped light into the main light beam and the auxiliary light beam, wherein the first region is monitored with the main light beam.

10. The method of claim 8, further comprising splitting the source light into the shaped light and the auxiliary light beam, wherein the first region is monitored with the shaped light.

11. The method of claim 8, wherein the main light beam is associated with a main pixel set and the auxiliary light beam is associated with an auxiliary pixel set, wherein the set of image pixels comprise the main pixel set and auxiliary pixel set, the method further comprising:
detecting an object in response to the external surface distance for a pixel, within the main pixel set, falling below a distance threshold; and
detecting a void in response to the external surface distance for a pixel, within the auxiliary pixel set, exceeding a second distance threshold.

12. The method of claim 7, wherein the source light is emitted at an average optical power between 10 mW and 2 W.

13. The method of claim 7, wherein the shaped light comprises modulated light, wherein determining pixel parameters comprises determining a modulation shift in reflected light from the image, wherein the external surface distance is determined based on the modulation shift, an illumination time, and an image sampling time.

14. The method of claim 13, wherein the light comprises amplitude-modulated light, wherein the modulation shift comprises a phase shift.

15. An environment mapping method, comprising:
emitting source light;
shaping more than a threshold proportion of the source light into shaped light;
illuminating an external scene with the shaped light, the shaped light having a minor dimension, wherein the shaped light comprises modulated light;
sampling an image of the illuminated external scene, the image having a field of view larger than the minor dimension;
determining pixel parameters for each pixel of a set of image pixels from the image, comprising determining a modulation shift in reflected light from the image;
for each pixel of the set of image pixels, determining an external surface distance based on the determined pixel parameters, wherein the external surface distance is determined based on the modulation shift, an illumination time, and an image sampling time; and
generating a virtual scene representation comprising the external surface distance for each pixel of the set of image pixels mapped to a predetermined virtual angular position corresponding to the respective pixel.

16. The method of claim 15, wherein the light comprises amplitude-modulated light, wherein the modulation shift comprises a phase shift.

17. The method of claim 15, further comprising monitoring a first region of the external scene and a second region of the external scene, wherein the second region is separated from the first region by a predetermined angle extending along the minor dimension of the shaped light; wherein the second region is monitored with an auxiliary light beam.

18. The method of claim 17, further comprising splitting the shaped light into the main light beam and the auxiliary light beam, wherein the first region is monitored with the main light beam.

19. The method of claim 17, further comprising splitting the source light into the shaped light and the auxiliary light beam, wherein the first region is monitored by the shaped light.

20. The method of claim 17, wherein the main light beam is associated with a main pixel set and the auxiliary light beam is associated with an auxiliary pixel set, wherein the set of image pixels comprise the main pixel set and auxiliary pixel set, the method further comprising:
detecting an object in response to the external surface distance for a pixel, within the main pixel set, falling below a distance threshold; and
detecting a void in response to the external surface distance for a pixel, within the auxiliary pixel set, exceeding a second distance threshold.

* * * * *